(12) United States Patent
Shibata

(10) Patent No.: US 10,506,130 B2
(45) Date of Patent: Dec. 10, 2019

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/211,475

(22) Filed: Dec. 6, 2018

(65) Prior Publication Data

US 2019/0174023 A1    Jun. 6, 2019

(30) Foreign Application Priority Data

Dec. 6, 2017    (JP) ................................ 2017-234083

(51) Int. Cl.
*H04N 1/327*    (2006.01)
*H04W 76/14*    (2018.01)
(Continued)

(52) U.S. Cl.
CPC ....... *H04N 1/32776* (2013.01); *H04B 5/0031* (2013.01); *H04N 1/00307* (2013.01);
(Continued)

(58) Field of Classification Search
None
See application file for complete search history.

(56) References Cited

U.S. PATENT DOCUMENTS

| 9,210,732 B2 | 12/2015 | Suzuki |
| 2013/0044635 A1* | 2/2013 | Suzuki ................. H04W 76/14 370/254 |

(Continued)

FOREIGN PATENT DOCUMENTS

| JP | 2013-042400 A | 2/2013 |
| JP | 2013-214803 A | 10/2013 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Andrew H Lam
(74) *Attorney, Agent, or Firm* — Banner & Witcoff, Ltd.

(57) ABSTRACT

A communication device may receive first identification information for identifying a first terminal device from the first terminal device, receive a connection request including second identification information for identifying a second terminal device from the second terminal device after the first identification information has been received from the first terminal device, determine whether the first identification information is identical to the second identification information in a case where the connection request is received from the second terminal device, establish a second wireless connection with the second terminal device by sending a predetermined response to the second terminal device in a case where it is determined that the first identification information is identical to the second identification information, and not send the predetermined response to the second terminal device in a case where it is determined that the first identification information is not identical to the second identification information.

15 Claims, 12 Drawing Sheets

(51) Int. Cl.
*H04B 5/00* (2006.01)
*H04N 1/00* (2006.01)
*H04N 1/44* (2006.01)
*H04N 1/32* (2006.01)
*H04W 84/12* (2009.01)

(52) U.S. Cl.
CPC ....... *H04N 1/32507* (2013.01); *H04N 1/4413* (2013.01); *H04N 1/4433* (2013.01); *H04W 76/14* (2018.02); *H04N 2201/006* (2013.01); *H04N 2201/0094* (2013.01); *H04W 84/12* (2013.01)

(56) References Cited

U.S. PATENT DOCUMENTS

| 2013/0260818 | A1  |         | 10/2013 | Suzuki et al. |            |
|--------------|-----|---------|---------|---------------|------------|
| 2015/0189023 | A1  | *       | 7/2015  | Kubota        | G06F 16/9566 |
|              |     |         |         |               | 455/7      |
| 2016/0316511 | A1  |         | 10/2016 | Suzuki et al. |            |

* cited by examiner

FIG. 11
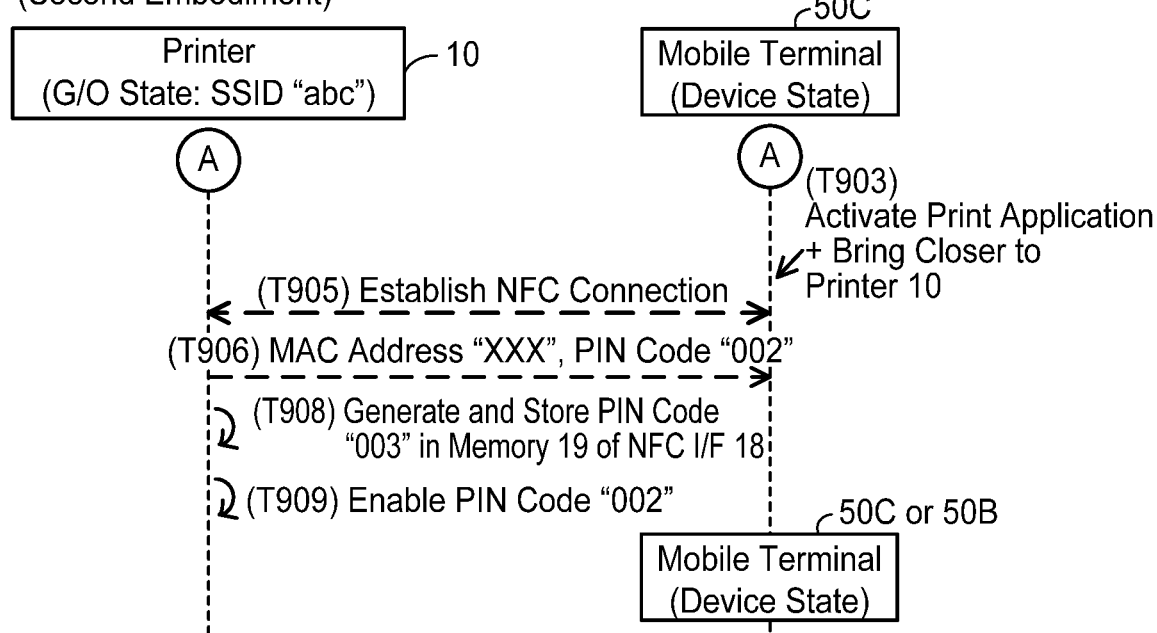
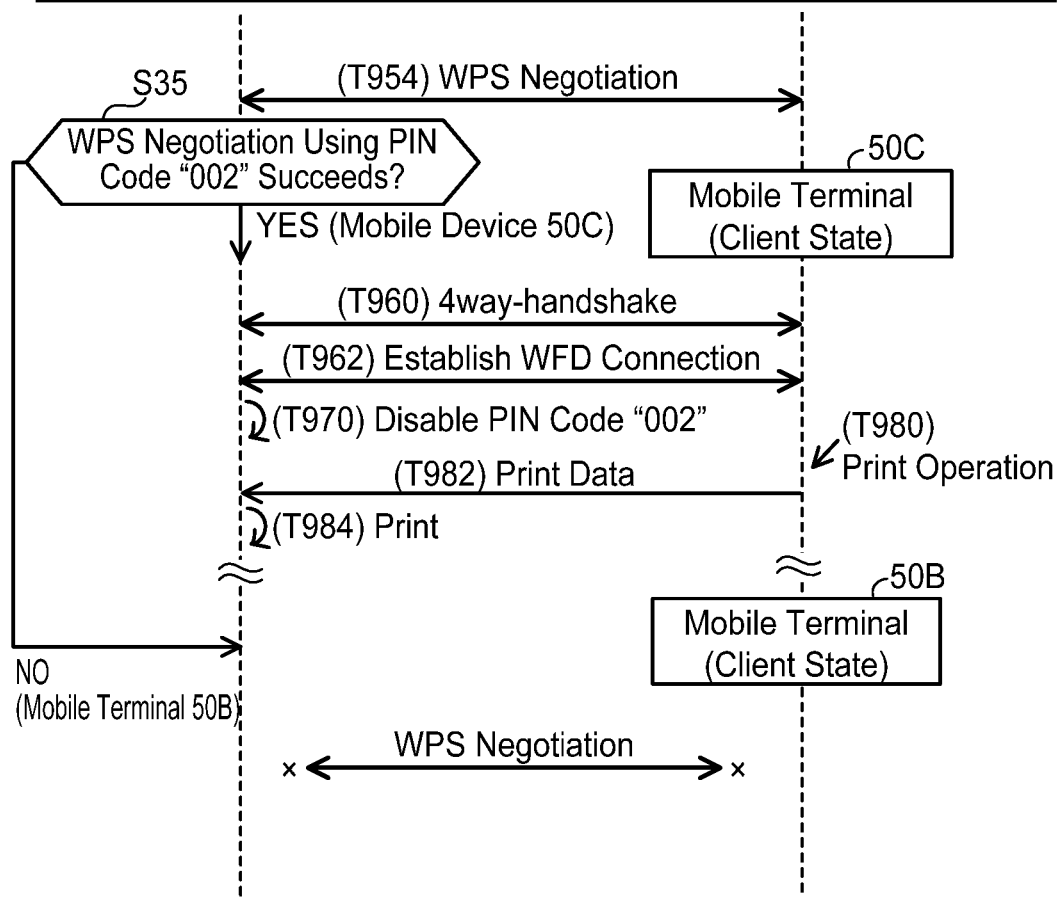

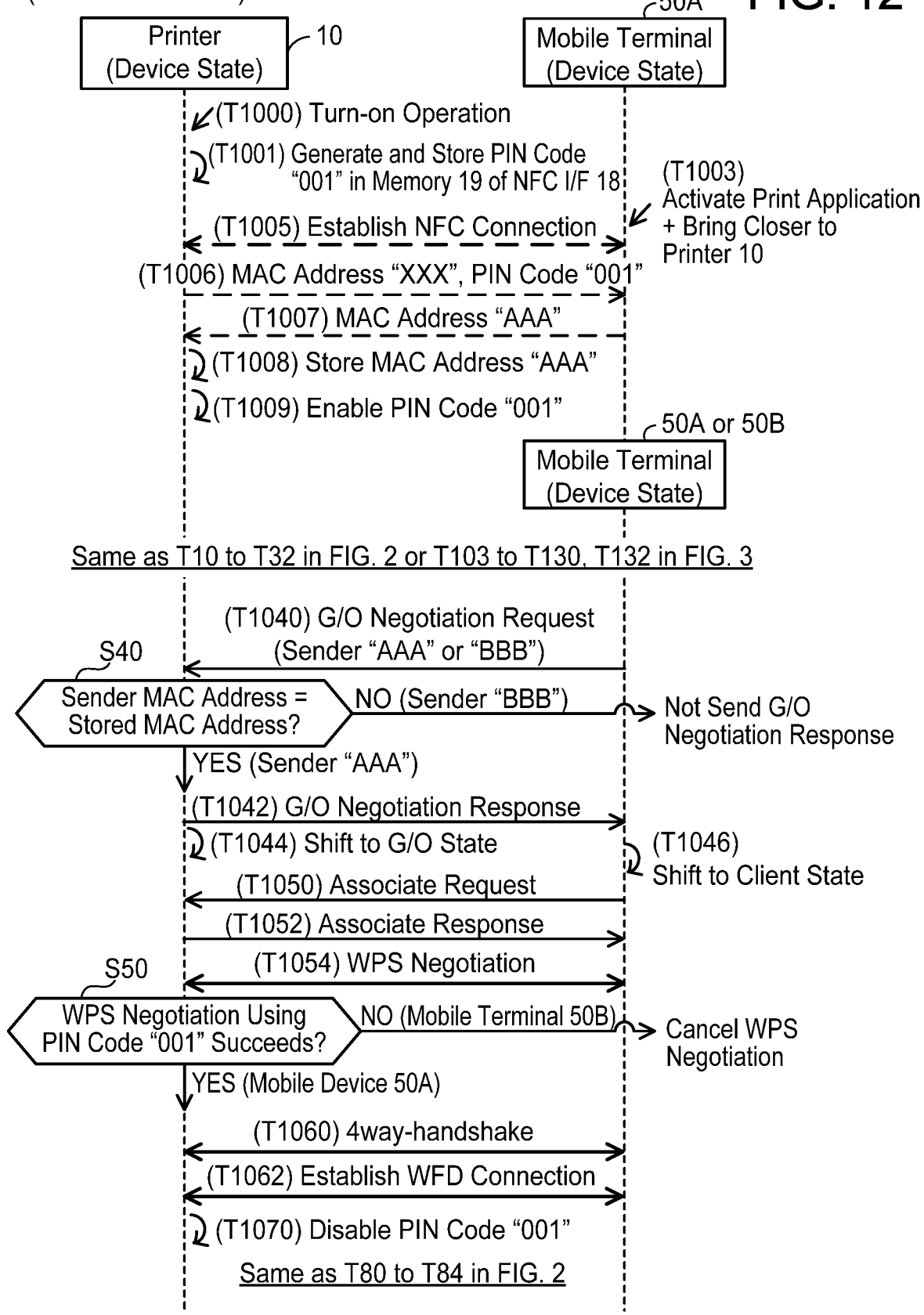

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE

This application claims priority to Japanese Patent Application No. 2017-234083, filed on Dec. 6, 2017, the entire contents of which are incorporated herein by reference.

TECHNICAL FIELD

The disclosure herein discloses a communication device configured to establish a wireless connection with a terminal device.

BACKGROUND ART

A technique for establishing a wireless connection according to a WFD (abbreviation of Wi-Fi Direct) scheme (hereinbelow termed "WFD connection") between an MFP (abbreviation of Multi-Function Peripheral) and a mobile terminal is known. The MFP shifts to a mode in which various communications for establishing the WFD connection can be executed (that is, WFD=ON mode) when a wireless connection according to an NFC (abbreviation of Near Field Communication) scheme (hereinbelow termed "NFC connection") is established with the mobile terminal. Due to this, the MFP executes various communications with the mobile terminal to establish the WFD connection with the mobile terminal.

SUMMARY

In the above technique, after the MFP has shifted to the WFD=ON mode in response to an NFC connection having been established with a first mobile terminal, when the MFP receives a connection request from a second mobile terminal which is different from the first mobile terminal, the MFP may establish a WFD connection with the second mobile terminal. In this case, the MFP may not be able to establish a WFD connection with the first mobile terminal with which the NFC connection has been established.

The disclosure herein discloses a communication device that can suitably establish a second wireless connection via a second wireless interface with a first terminal device after a first wireless connection via a first wireless interface has been established with the first terminal device.

A communication device disclosed herein may comprise: a first wireless interface; a second wireless interface; a processor; and a memory storing computer-readable instructions therein, the computer-readable instructions, when executed by the processor, causing the communication device to: in a case where a first wireless connection via the first wireless interface is established with a first terminal device, receive first identification information for identifying the first terminal device from the first terminal device via the first wireless interface by using the first wireless connection; after the first identification information has been received from the first terminal device, receive a connection request for requesting establishment of a wireless connection from a second terminal device via the second wireless interface, the connection request including second identification information for identifying the second terminal device; in a case where the connection request is received from the second terminal device, determine whether the first identification information is identical to the second identification information; and in a case where it is determined that the first identification information is identical to the second identification information, establish a second wireless connection via the second wireless interface with the second terminal device by sending a predetermined response to the second terminal device via the second wireless interface, wherein in a case where it is determined that the first identification information is not identical to the second identification information, the predetermined response may not sent to the second terminal device that is different from the first terminal device.

Further, a communication device disclosed herein may comprise: a first wireless interface; a second wireless interface; a processor; and a memory storing computer-readable instructions therein, the computer-readable instructions, when executed by the processor, causing the communication device to: in a case where a first wireless connection via the first wireless interface is established with a first terminal device, send first authentication information prepared by the communication device to the first terminal device via the first wireless interface by using the first wireless connection; after the first authentication information has been sent to the first terminal device, determine whether specific information is received from a second terminal device via the second wireless interface during a predetermined communication being executed with the second terminal device, the specific information being obtained by using the first authentication information, the predetermined communication being for establishing a second wireless connection; and in a case where it is determined that the specific information is received from the second terminal device, establish the second wireless connection via the second wireless interface with the second terminal device by completing the predetermined communication with the second terminal device, wherein in a case where it is determined that the specific information is not received from the second terminal device, the predetermined communication with the second terminal device may be canceled.

A control method, computer-readable instructions, and a computer-readable recording medium storing the computer-readable instructions for implementation of the aforementioned communication device are also novel and useful. A communication system which comprises the aforementioned communication device and terminal device is also novel and useful.

BRIEF DESCRIPTION OF THE DRAWINGS

FIG. 11 shows a sequence diagram continued from FIG. 10.

FIG. 12 shows a sequence diagram of a third embodiment.

EMBODIMENTS

Figure 1:
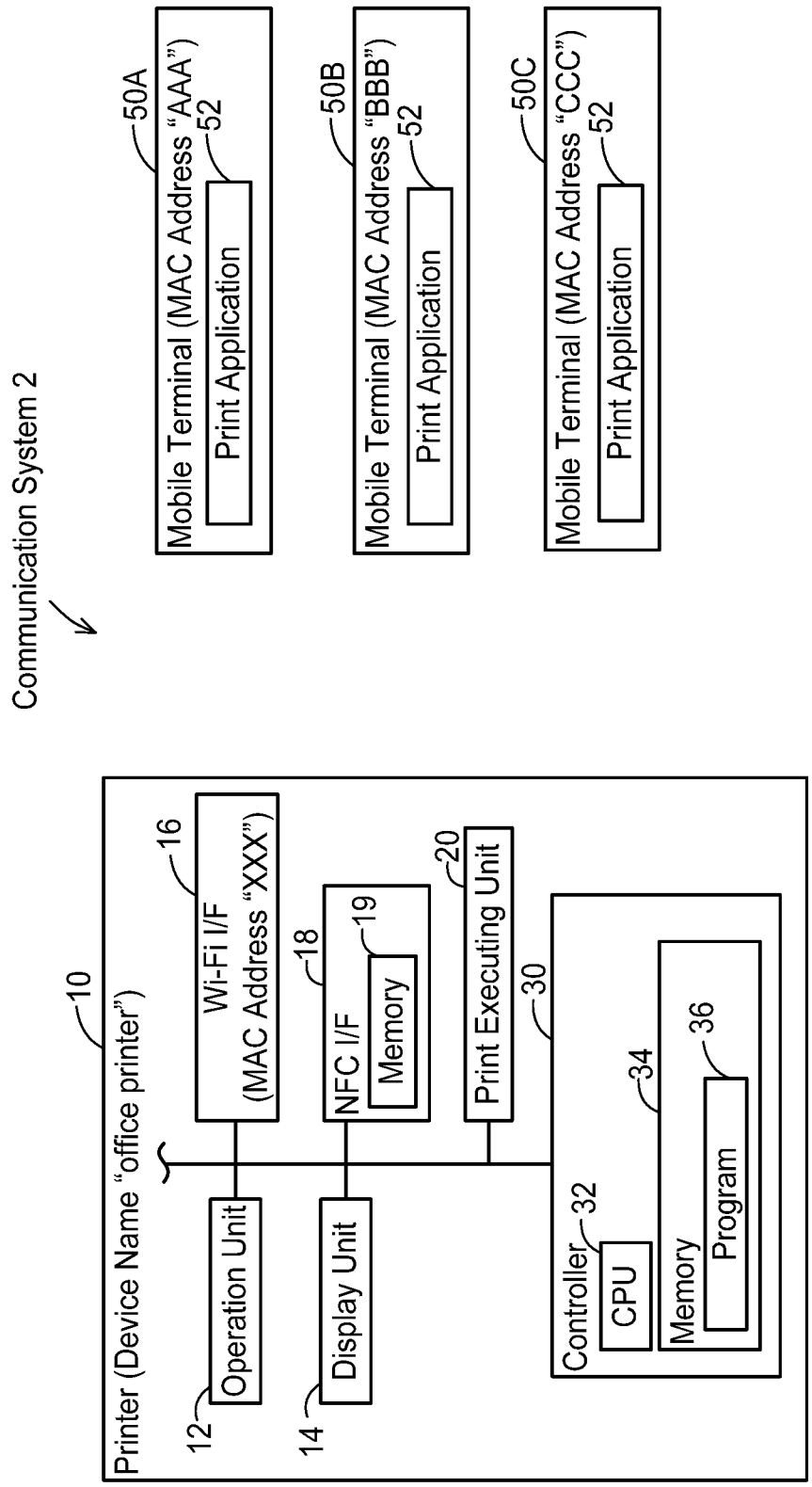
FIG. 1 shows a configuration of a communication system.

First Embodiment (Configuration of Communication System 2; FIG. 1)

As shown in FIG. 1, a communication system 2 includes a printer 10 and a plurality of mobile terminals 50A, 50B, 50C. Each of these devices 10, 50A to 50C is capable of executing a wireless communication according to a Wi-Fi scheme (hereinbelow termed "Wi-Fi communication") and a wireless communication according to an NFC (abbreviation of Near Field Communication) scheme (hereinbelow termed "NFC communication"). Especially, each of the devices 10, 50A to 50C is capable of executing (i.e., supporting) a wireless communication according to a WFD (abbreviation of Wi-Fi Direct (registered trademark)) scheme complying with the Wi-Fi scheme (hereinbelow termed "WFD communication").

(Configuration of Printer 10)

The printer 10 is a peripheral device capable of executing a print function (e.g., a peripheral device of the mobile terminal 50A). The printer 10 has a device name "office printer", which is a name of the printer 10. The printer 10 includes an operation unit 12, a display unit 14, a Wi-Fi interface 16, an NFC interface 18, a print executing unit 20, and a controller 30. The respective units 12 to 30 are connected to a bus line (reference sign not given). Hereinbelow, an interface will be denoted "I/F".

The operation unit 12 includes a plurality of keys, and is configured to accept user operations. The display unit 14 is a display for displaying various types of information. The print executing unit 20 includes a print mechanism of an inkjet scheme or a laser scheme.

The Wi-Fi I/F 16 is a wireless interface configured to execute a Wi-Fi communication according to the Wi-Fi scheme. The Wi-Fi I/F 16 is allocated with a MAC address "XXX". The Wi-Fi scheme is a wireless communication scheme for executing a wireless communication according to, for example, IEEE (abbreviation of the Institute of Electrical and Electronics Engineers, Inc.) standard 802.11 and standards complying therewith (e.g., 802.11a, 11b, 11g, 11n). The Wi-Fi I/F 16 especially supports the WFD scheme established by the Wi-Fi Alliance, and is capable of executing a wireless communication according to the WFD scheme. That is, the printer 10 is a WFD device. The WFD scheme is a wireless communication scheme described in the standard document "Wi-Fi Peer-to-Peer (P2P) Technical Specification Version 1.1" created by the Wi-Fi Alliance. In the WFD standard, three states, namely a Group Owner state (hereinbelow termed "G/O state"), a client state, and a device state, are defined as states of WFD devices. WFD devices are capable of selectively operating in one of the aforementioned three states.

Further, the Wi-Fi I/F 16 supports a WPS (abbreviation of Wi-Fi Protected Setup) established by the Wi-Fi Alliance. The WPS is a so-called automatic wireless setting or easy wireless setting, and it is a standard capable of easily establishing a wireless connection between a pair of devices even if wireless setting information (such as a password, an authentication scheme, and an encryption scheme) for establishing the wireless connection according to the Wi-Fi scheme is not inputted by a user. In this embodiment, the Wi-Fi I/F 16 supports a PBC (abbreviation of Push Button Configuration) scheme in the WPS standard. The PBC scheme is a scheme for establishing a wireless connection between a pair of devices in a case where a predetermined operation (such as an operation to press a button) is performed by the user to each of the pair of devices and a PBC mode is thereby enabled.

The NFC I/F 18 is an I/F for executing an NFC communication according to the NFC scheme. The NFC scheme is a wireless communication scheme based on international standards such as ISO/IEC 14443, 15693, and 18092. As types of I/F for executing the NFC communication, an I/F called an NFC forum device (NFC Forum Device) and an I/F called an NFC forum tag are known. In this embodiment, the NFC I/F 18 is an NFC forum tag. Further, the NFC I/F 18 includes a memory 19.

Here, differences between the Wi-Fi communication and the NFC communication will be described. A communication speed of the Wi-Fi communication (e.g., maximum communication speed of 11 to 600 Mbps) is faster than a communication speed of the NFC communication (e.g., maximum communication speed of 100 to 424 Kbps). Further, a carrier wave frequency of the Wi-Fi communication (e.g., 2.4 GHz band or 5.0 GHz band) is different from a carrier wave frequency of the NFC communication (e.g., 13.56 MHz band). Further, a maximum distance with which the Wi-Fi communication can be executed (e.g., about 100 m at maximum) is greater than a maximum distance with which the NFC communication can be executed (e.g., about 10 cm at maximum).

The controller 30 includes a CPU 32 and a memory 34. The CPU 32 executes various processes in accordance with a program 36 stored in the memory 34. The memory 34 is constituted of a volatile memory, a nonvolatile memory, and the like.

(Configurations of Respective Mobile Terminals 50A to 50C)

Each of the mobile terminals 50A to 50C is a mobile terminal device such as a cell phone, a smartphone, a PDA, a laptop PC, a tablet PC, a portable music player, and a portable movie player. Each of the mobile terminals 50A to 50C includes a Wi-Fi I/F that is not shown, and the Wi-Fi I/Fs of the mobile terminals 50A to 50C are respectively allocated with MAC addresses "AAA", "BBB", and "CCC".

Further, each of the mobile terminals 50A to 50C stores a print application (hereafter termed "app") 52. This app 52 is an app for causing the printer 10 to execute printing by establishing a wireless connection according to the WFD scheme (hereafter termed "WFD connection") between the printer 10 and the relevant one of the mobile terminals 50A to 50C. The app 52 may be installed in each of the mobile terminals 50A to 50C from a server on the Internet provided by a vendor of the printer 10, or may be installed in each of the mobile terminals 50A to 50C from a medium that is shipped with the printer 10.

Figure 2:
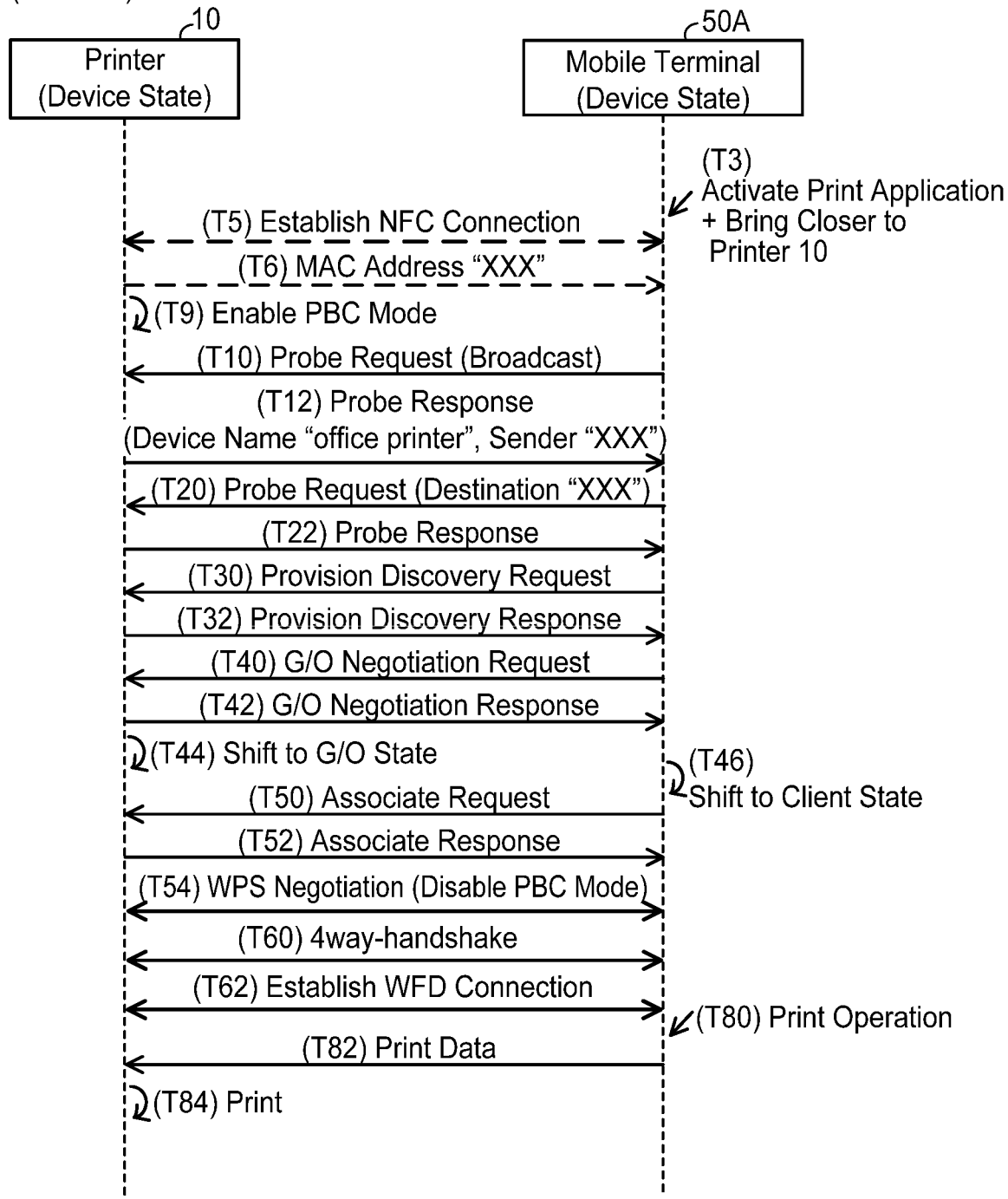
FIG. 2 shows a sequence diagram of Case A1 in which a WFD connection is established after an NFC connection has been established, under a situation where a printer is in a device state.

(Processes by Respective Devices 10, 50A to 50C; FIG. 2, Etc.)

Next, specific examples of processes executed by the respective devices 10, 50A to 50C will be described with reference to FIG. 2 and the subsequent drawings. In FIG. 2, etc., broken line arrows and solid line arrows between the printer 10 (or 100) and the mobile terminals 50A to 50C respectively indicate NFC communications and Wi-Fi communications. Further, the printer 10 executes the NFC communications via the NFC I/F 18 and executes the Wi-Fi communications via the Wi-Fi I/F 16. Thus, hereinbelow, descriptions "via the NFC I/F 18" and "via the Wi-Fi I/F 16" will be omitted.

(Case A1; FIG. 2)

FIG. 2 shows Case A1 in which a WFD connection is established after an NFC connection has been established between the printer 10 and the mobile terminal 50A. Upon when a power of the printer 10 is turned on, the CPU 32 of the printer 10 supplies the MAC address "XXX" to the NFC I/F 18 and causes the MAC address "XXX" to be stored in the memory 19 of the NFC I/F 18. Accordingly, in an initial state of FIG. 2, the MAC address "XXX" is stored in the memory 19. This applies similarly to FIGS. 3, 5 to 7, and 9 to be described later.

In T3, the app 52 in the mobile terminal 50A is activated by a user, and the mobile terminal 50A is brought closer to the printer 10. Due to this, in T5, an NFC connection is established between the printer 10 and the mobile terminal 50A. In this case, in T6, the NFC I/F 18 of the printer 10 uses the NFC connection to send the MAC address "XXX" in the memory 19 to the mobile terminal 50A. Further, in T9, the CPU 32 of the printer 10 enables the PBC mode in response to the NFC connection with the mobile terminal 50A being established. Due to this, the user does not have to perform an operation to enable the PBC mode on the printer 10, so convenience for the user can be improved.

In T10, the CPU 32 receives a Probe request broadcasted from the mobile terminal 50A, and in T12, it sends a Probe response to the mobile terminal 50A. This Probe response includes the device name "office printer" and the MAC address "XXX" of the sender.

In response to sending the Probe request in T10, the mobile terminal 50A receives a Probe response from each of one or more devices including the printer 10. In this case, the mobile terminal 50A can identify the printer 10, which is a connection target, by identifying the Probe response including the MAC address "XXX" that was received in T6 (i.e., the Probe response sent in T12 from the printer 10) from among the one or more Probe responses. Then, in T20, the mobile terminal 50A sends a Probe request including the MAC address "XXX" of the identified printer 10 as its destination to the printer 10 (that is, this Probe request is unicasted).

The CPU 32 receives the Probe request including the MAC address "XXX" from the mobile terminal 50A in T20, and then sends a Probe response to the mobile terminal 50A in T22.

The CPU 32 receives a Provision Discovery request from the mobile terminal 50A in T30, and then sends a Provision Discovery response to the mobile terminal 50A in T32.

In T40, the CPU 32 receives a G/O Negotiation request from the mobile terminal 50A. The G/O Negotiation request is a command for requesting to execute a G/O Negotiation, which is a communication for deciding which one of the printer 10 and the mobile terminal 50A should be a G/O. Then, in T42, the CPU 32 sends a G/O Negotiation response to the mobile terminal 50A to execute the G/O Negotiation with the mobile terminal 50A. In the present case, it is decided that the printer 10 becomes the G/O and the mobile terminal 50A becomes a client. The printer 10 shifts to the G/O state in T44 and the mobile terminal 50A shifts to the client state in T46.

Next, the CPU 32 receives an Associate request from the mobile terminal 50A in T50, and then sends an Associate response to the mobile terminal 50A in T52.

In T54, the CPU 32 executes a Negotiation according to the WPS with the mobile terminal 50A. In the WPS Negotiation, the CPU 32 sends to the mobile terminal 50A an SSID and a password to be used in a wireless network in which the printer 10 operates as the G/O. Further, the CPU 32 disables the PBC mode in the course of the WPS Negotiation. Due to this, even if the CPU 32 receives a request (such as an Associate request) according to the PBC mode from another mobile terminal (such as 50B), the CPU 32 does not send a response to this request to the other mobile terminal, and thus does not establish a WFD connection with the other mobile terminal.

In T60, the CPU 32 executes a 4way-handshake communication with the mobile terminal 50A. In at least a part of the process of the 4way-handshake communication, the CPU 32 sends to the mobile terminal 50A encrypted information which was encrypted using a key generated from the aforementioned SSID and password, and causes the mobile terminal 50A to decrypt the encrypted information. In a case of receiving a response to the encrypted information from the mobile terminal 50A, that is, in a case where the encrypted information was successfully decrypted in the mobile terminal 50A, the CPU 32 completes the 4way-handshake communication with the mobile terminal 50A. The CPU 32 may complete the 4way-handshake communication with the mobile terminal 50A in a case where the CPU 32 receives encrypted information from the mobile terminal 50A and successfully decrypts this encrypted information in at least a part of the process of the 4way-handshake communication. As a result, the CPU 32 establishes a WFD connection with the mobile terminal 50A in T62.

In response to a print operation for causing the printer 10 to execute printing being performed on the mobile terminal 50A in T80, the CPU 32 receives print data from the mobile terminal 50A in T82 by using the WFD connection, and causes the print executing unit 20 to execute printing according to the print data in T84.

As above, in this embodiment, the WFD connection is established after the NFC connection has been established between the printer 10 and the mobile terminal 50A, and the print data is communicated by using the WFD connection. A communication speed using the WFD connection (i.e., the communication speed of the Wi-Fi communication) is faster than the communication speed using the NFC communication. Due to this, the print data can be communicated at faster speed than in a case of communicating the print data using the NFC communication. Further, the user simply needs to perform the operation to activate the app 52 and the operation to bring the mobile terminal 50A close to the printer 10 in order to establish the WFD connection between the printer 10 and the mobile terminal 50A. Due to this, the user can easily establish the WFD connection.

Figure 3:
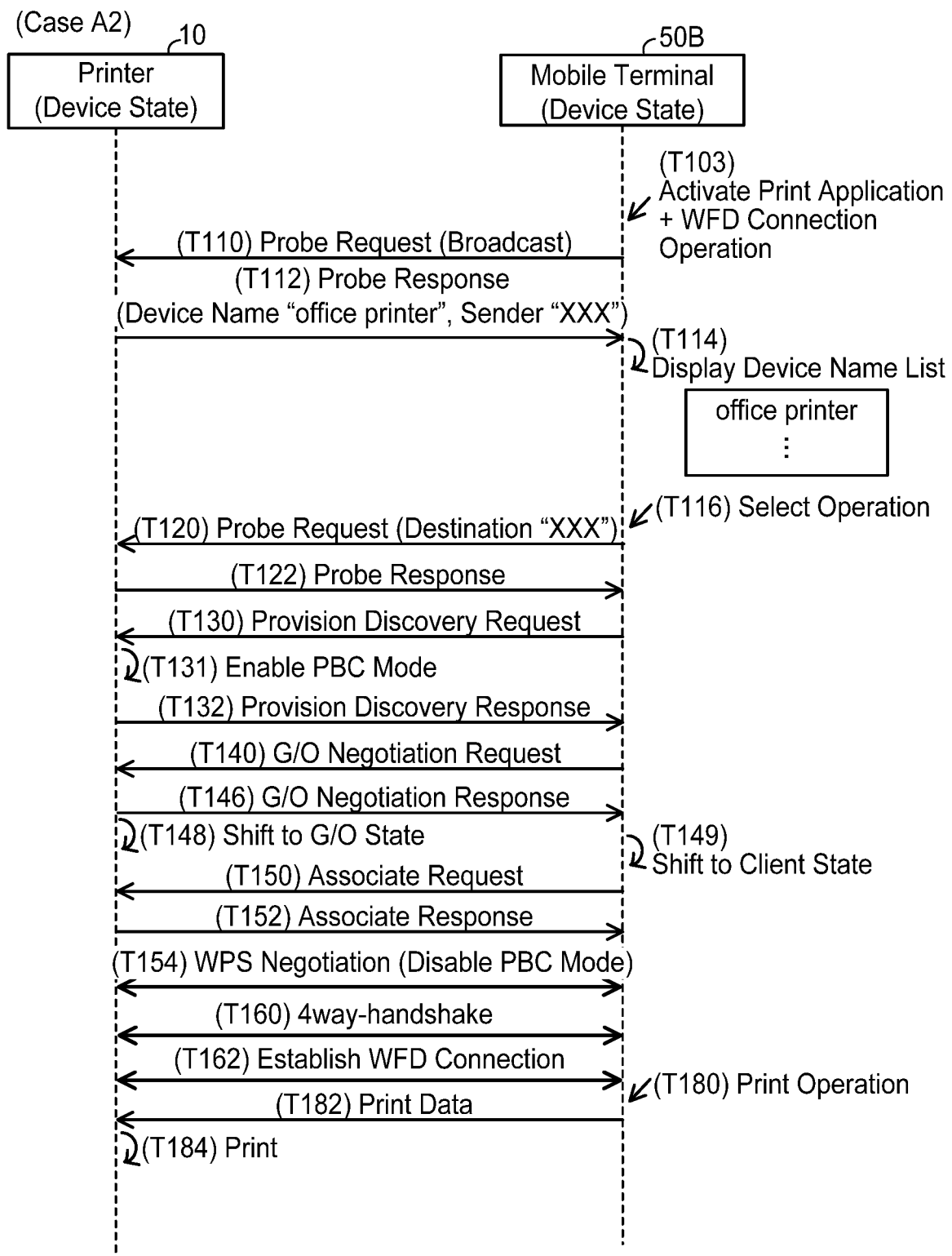
FIG. 3 shows a sequence diagram of Case A2 in which a WFD connection is established without establishing an NFC connection, under the situation where the printer is in the device state.

(Case A2; FIG. 3)

Next, Case A2 in which a WFD connection is established between the printer 10 and the mobile terminal 50B without establishing an NFC connection therebetween will be described with reference to FIG. 3. In T103, the app 52 in the mobile terminal 50B is activated by the user, and a WFD connection operation is performed on the mobile terminal 50B. Due to this, in T110, the CPU 32 of the printer 10 receives a Probe request broadcasted from the mobile terminal 50B. T110 and T112 are the same as T10 and T12 of FIG. 2 except that the communication target is the mobile terminal 50B.

In response to sending the Probe request in T110, the mobile terminal 50B receives a Probe response from each of one or more devices including the printer 10. However, since the mobile terminal 50B does not receive the MAC address "XXX" from the printer 10 by using an NFC connection, it cannot identify the Probe response including the MAC address "XXX" from among the one or more received Probe responses (that is, the printer 10, which is the connection target, cannot be identified). Due to this, in T114, the mobile terminal 50B displays a device name list that indicates one or more device names included in the one or more received Probe responses. Then, in T116, the device name "office printer" of the printer 10 is selected by the user from the device name list. In this case, in T120, the mobile terminal 50B identifies the MAC address "XXX" included in the Probe response of T112 including the selected device name "office printer" (that is, the printer 10, which is the connection target, is identified), and sends a Probe request including the identified MAC address "XXX" as its destination to the printer 10. T122 is the same as T22 of FIG. 2 except that the communication target is the mobile terminal 50B.

In response to receiving a Provision Discovery request from the mobile terminal 50B in T130, the CPU 32 enables the PBC mode in T131, and sends a Provision Discovery response to the mobile terminal 50B in T132.

The CPU 32 receives a G/O Negotiation request from the mobile terminal 50B in T140, sends a G/O Negotiation response to the mobile terminal 50B in T146 to execute the G/O Negotiation with the mobile terminal 50B. In the present case, the printer 10 shifts to the G/O state in T148, and the mobile terminal 50B shifts to the client state in T149. T150 to T184 are the same as T50 to T84 of FIG. 2 except that the communication target is the mobile terminal 50B.

Figure 4:
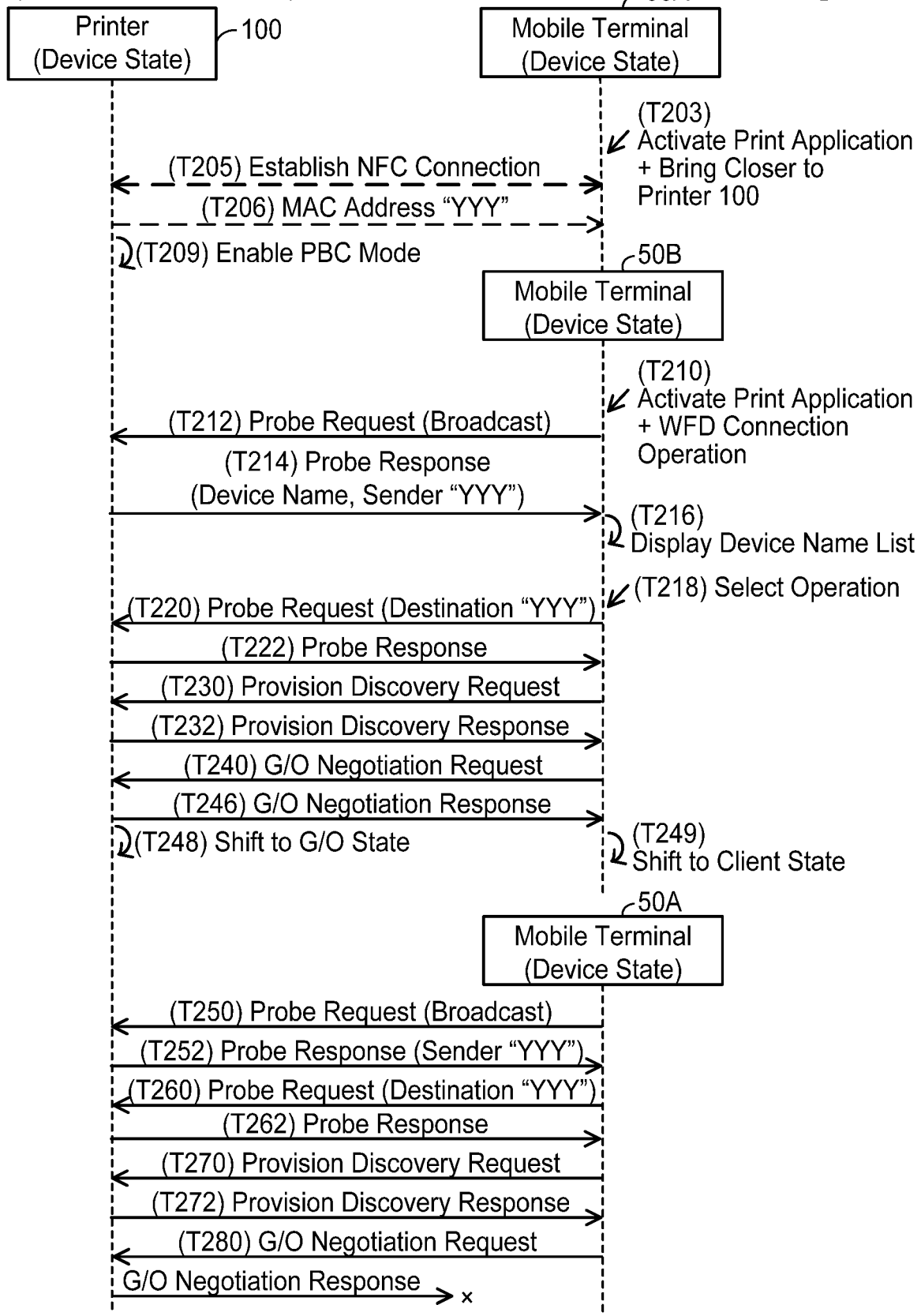
FIG. 4 shows a sequence diagram of a first comparative example.

As shown in Cases A1 and A2 of FIGS. 2 and 3, the printer 10 can establish the WFD connection with the respective mobile terminals 50A, 50B. Here, a situation will be assumed in which, after the PBC mode has been enabled in the printer 10 in response to the NFC connection with the mobile terminal 50A having been established (i.e., after T9 of FIG. 2), the WFD connection operation is performed on the mobile terminal 50B which is different from the mobile terminal 50A. In this case, in a conventional printer, there had been a possibility that the WFD connection with the mobile terminal 50A, with which the NFC connection has been established, could not have suitably been established. With reference to FIG. 4, a first comparative example of an operation of such a conventional printer 100 will be described.

First Comparative Example; FIG. 4

T203 and T205 are the same as T3 and T5 of FIG. 2 except that the printer 100 of the first comparative example is used. The printer 100 uses the NFC connection to send a MAC address "YYY" of the printer 100 to the mobile terminal 50A in T206, and enables the PBC mode in T209.

Subsequent T210 and T212 are the same as T103 and T110 of FIG. 3 except that the printer 100 is used. In T214, the printer 100 sends to the mobile terminal 50B a Probe response including a device name of the printer 100 and the MAC address "YYY" of the sender.

Subsequent T216 to T246 are the same as T114 to T140 and T146 of FIG. 3 except that the printer 100 of the first comparative example is used. As a result, the printer 100 shifts to the G/O state in T248 and the mobile terminal 50B shifts to the client state in T249.

As aforementioned, despite the NFC connection having been established between the printer 100 and the mobile terminal 50A, the G/O Negotiation is executed between the printer 100 and the mobile terminal 50B which is different from the mobile terminal 50A and the printer 100 shifts to the G/O state. Further, after this, T250 to T272 are executed between the printer 100 and the mobile terminal 50A. T250 to T272 are the same as T10 to T32 of FIG. 2 except that the printer 100 is used. Next, in T280, the printer 100 receives a G/O Negotiation request from the mobile terminal 50A. However, since the printer 100 already has shifted to the G/O state (T248), the G/O Negotiation with the mobile terminal 50A cannot be executed. Thus, the printer 100 does not send a G/O Negotiation response to the mobile terminal 50A, as a result of which the WFD connection with the mobile terminal 50A cannot be established.

As shown in the first comparative example, there is the possibility that the conventional printer 100 cannot establish the WFD connection with the mobile terminal 50A with which the NFC connection has been established. Contrary to this, the printer 10 of the embodiment can suitably establish the WFD connection with the mobile terminal 50A with which the NFC connection has been established by executing processes of FIG. 5 described below.

Figure 5:
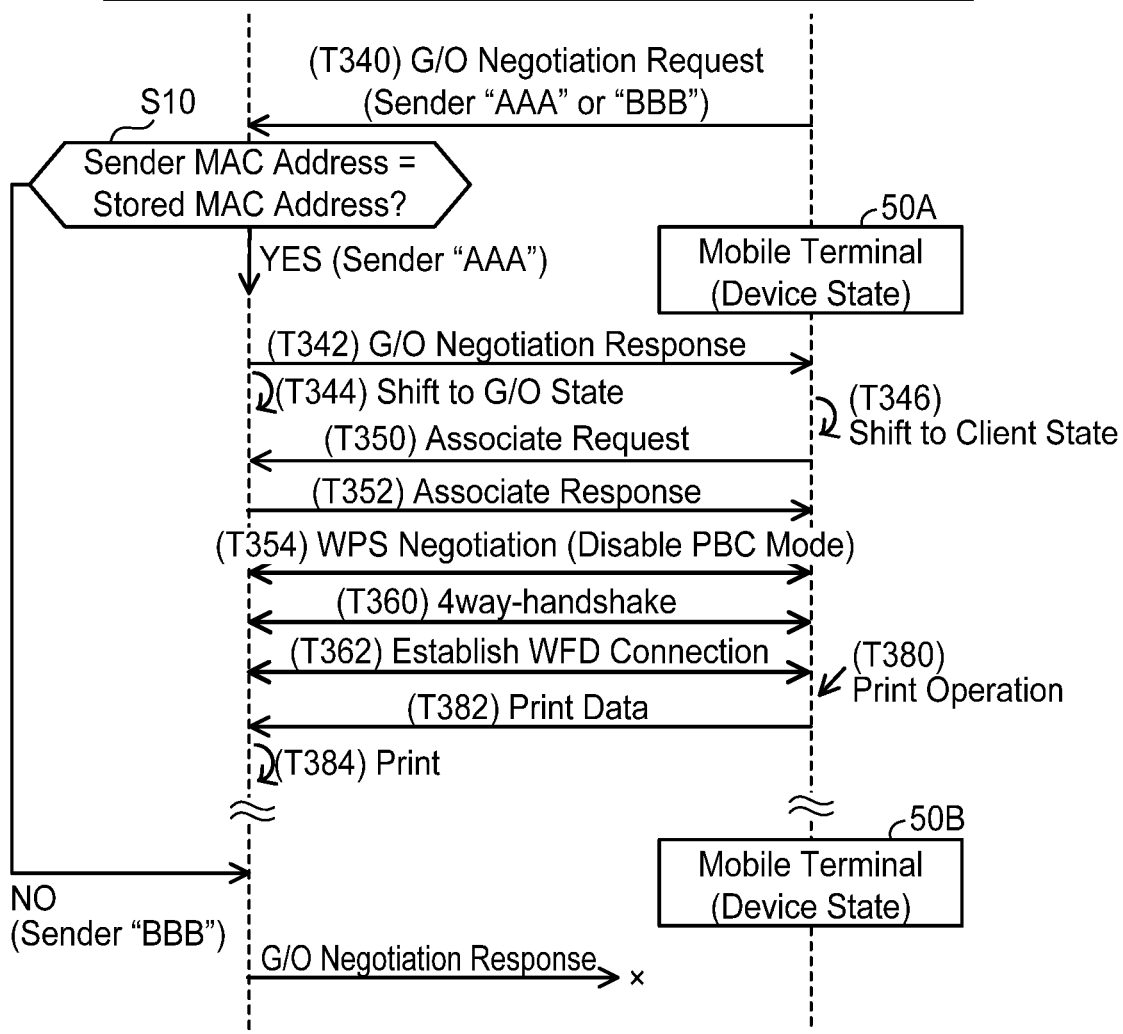
FIG. 5 shows a sequence diagram of Case A3 in which whether MAC addresses are identical to each other is determined under the situation where the printer is in the device state.

(Case A3; FIG. 5)

Case A3 in which a WFD connection between the printer 10 and the mobile terminal 50A can suitably be established will be described with reference to FIG. 5. T303 to T306 are the same as T3 to T6 of FIG. 2. The CPU 32 uses the NFC connection to receive the MAC address "AAA" of the mobile terminal 50A from the mobile terminal 50A in T307, and stores the MAC address "AAA" in the memory 34 in T308. T309 is the same as T9 of FIG. 2.

Hereinbelow, a situation in which the printer 10 executes communication with one of the mobile terminal 50A and the mobile terminal 50B will be assumed. A mobile terminal, which is a target of the communication, will be termed a "target mobile terminal". In a case where the target mobile terminal is the mobile terminal 50A, processes same as those of T10 to T32 of FIG. 2 are executed, and in a case where the target mobile terminal is the mobile terminal 50B, processes same as those of T103 to T130 and T132 of FIG. 3 are executed. After this, in T340, the CPU 32 receives a G/O Negotiation request from the target mobile terminal. This G/O Negotiation request includes the MAC address (i.e., "AAA" or "BBB") of the target mobile terminal.

In S10, the CPU 32 determines whether or not the MAC address of the sender in the G/O Negotiation request and the MAC address "AAA" stored in T308 in the memory 34 are identical to each other. In a case of determining that the MAC address of the sender and the stored MAC address "AAA" are identical, that is, in a case where the target mobile terminal is the mobile terminal 50A (YES in S10), the CPU 32 sends a G/O Negotiation response to the mobile terminal 50A in T342 and executes the G/O Negotiation with the mobile terminal 50A. As a result, the printer 10 shifts to the G/O state in T344 and the mobile terminal 50A shifts to the client state in T346. T350 to T384 are the same as T50 to T84 of FIG. 2. That is, the CPU 32 establishes a WFD connection with the mobile terminal 50A (T362), receives print data from the mobile terminal 50A by using the WFD connection (T382), and causes the print executing unit 20 to execute printing according to the print data (T384).

On the other hand, in a case of determining that the MAC address of the sender and the stored MAC address "AAA" are not identical, that is, in a case where the target mobile terminal is the mobile terminal 50B which is different from the mobile terminal 50A (NO in S10), the CPU 32 does not send a G/O Negotiation response to the mobile terminal 50B. Due to this, since the CPU 32 does not execute the G/O Negotiation with the mobile terminal 50B, it does not establish a WFD connection with the mobile terminal 50B. Thus, after this, the CPU 32 can execute the communications of T10 to T32 of FIG. 2 and T342 to T360 of FIG. 5 with the mobile terminal 50A, as a result of which a WFD connection with the mobile terminal 50A can suitably be established.

As above, in the case of receiving the G/O Negotiation request including the MAC address of the sender (i.e., "AAA" or "BBB") from the target mobile terminal (i.e., mobile terminal 50A or mobile terminal 50B) (T340) after having established the NFC connection with the mobile terminal 50A and having received the MAC address "AAA" from the mobile terminal 50A (T307), the printer 10 determines whether or not the stored MAC address "AAA" and the MAC address of the sender are identical to each other (S10). In the case of determining that the stored MAC address "AAA" and the MAC address of the sender are identical, that is, in the case where the mobile terminal 50A is the target mobile terminal (YES in S10), the printer 10 sends the G/O Negotiation response to the mobile terminal 50A (T342) and establishes the WFD connection with the mobile terminal 50A (T362). On the other hand, in the case of determining that the stored MAC address "AAA" and the MAC address of the sender are not identical, that is, in the case where the mobile terminal 50A is not the target mobile terminal (NO in S10), the printer 10 does not send the G/O Negotiation response to the mobile terminal 50B. Thus, the printer 10 can suitably establish the WFD connection with the mobile terminal 50A after the NFC connection has been established with the mobile terminal 50A.

Although not shown in the drawings, in each of Cases A1, A2, A3 in FIGS. 2, 3, and 5, the printer 10 may shift to the client state and the mobile terminal 50A may shift to the G/O state as a result of the G/O Negotiation. In this case, for example, the Associate request in T350 of FIG. 5 is sent from the printer 10 to the mobile terminal 50A, and the Associate response in T352 is sent from the mobile terminal 50A to the printer 10. Other features are the same as those of each of Cases, and the printer 10 can suitably establish the WFD connection with the mobile terminal 50A.

Figure 6:
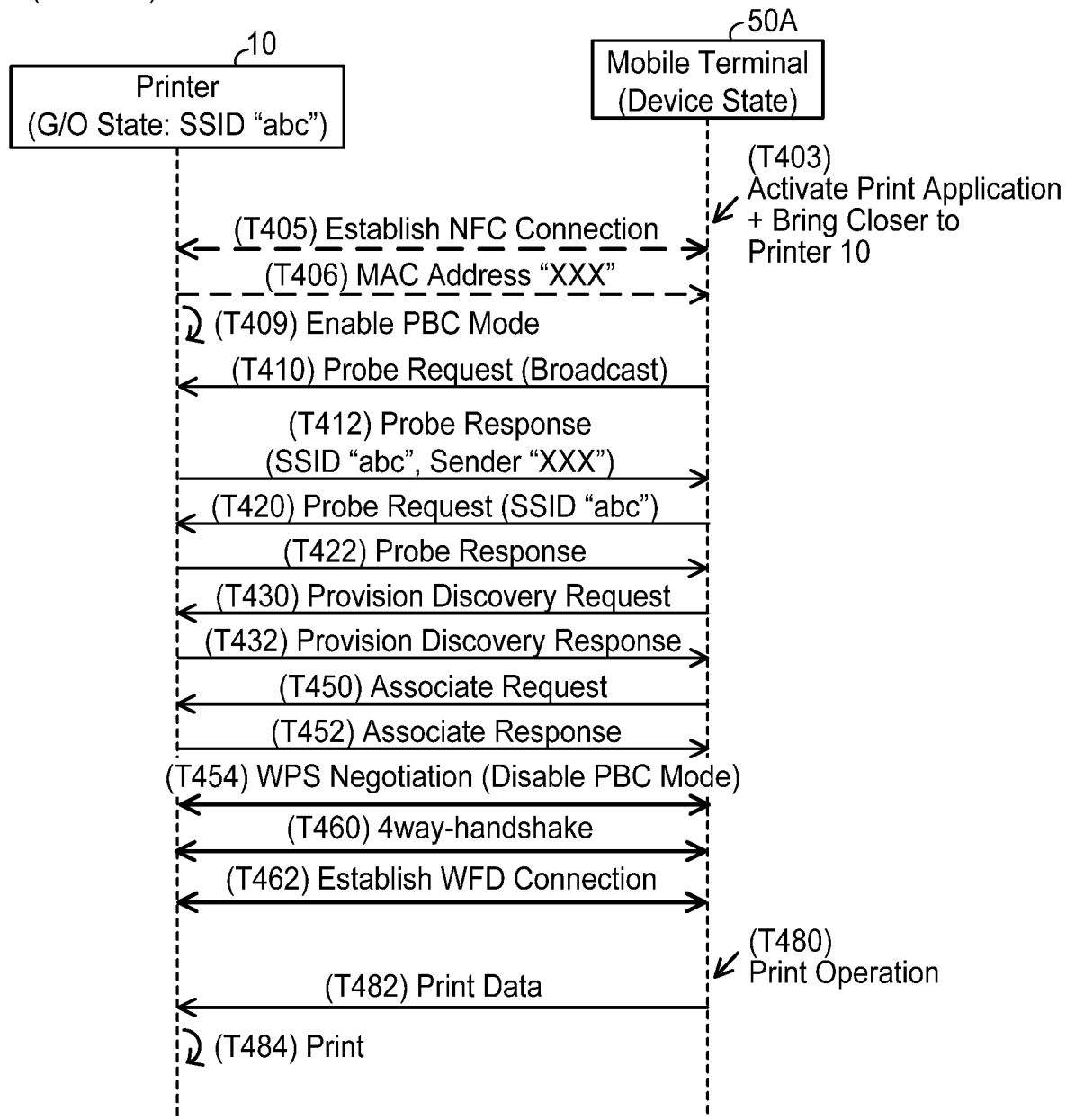
FIG. 6 shows a sequence diagram of Case B1 in which a WFD connection is established after an NFC connection has been established, under a situation where the printer is in a G/O state.

(Case B1; FIG. 6)

Next, Case B1 in which a WFD connection is established after an NFC connection has been established between the printer 10 and the mobile terminal 50A under a situation where the printer 10 is in the G/O state will be described with reference to FIG. 6. For example, when the printer 10 has shifted to the G/O state as a result of the printer 10 having executed the G/O Negotiation with a mobile terminal (such as 50C) which is different from the mobile terminal 50A, an initial state of this Case B1 is realized. Further, for example, when an operation to actively bring the printer 10 to the G/O state is performed on the printer 10 by the user, the initial state of this Case B1 is realized.

T403 to T410 are the same as T3 to T10 of FIG. 2 except that the printer 10 is in the G/O state. The CPU 32 of the printer 10 sends a Probe response to the mobile terminal 50A in T412. This Probe response includes an SSID "abc" used in a wireless network in which the printer 10 operates as the G/O and the MAC address "XXX" of the sender.

In response to sending the Probe request in T410, the mobile terminal 50A receives a Probe response from each of one or more devices including the printer 10. The mobile terminal 50A identifies the Probe response including the MAC address "XXX" received in T406 from among the one or more Probe responses, and sends to the printer 10 in T420 a Probe request including the SSID "abc" included in the identified Probe response as its destination.

T422 to T432 are the same as T22 to T32 of FIG. 2 except that the printer 10 is in the G/O state and the Probe request of T420 includes the SSID "abc". In the present case, since the printer 10 is already operating in the G/O state, the CPU 32 receives an Associate request from the mobile terminal 50A in T450 and sends an Associate response to the mobile terminal 50A in T452, without receiving a G/O Negotiation request from the mobile terminal 50A. T454 to T484 are the same as T54 to T84 of FIG. 2.

Figure 7:
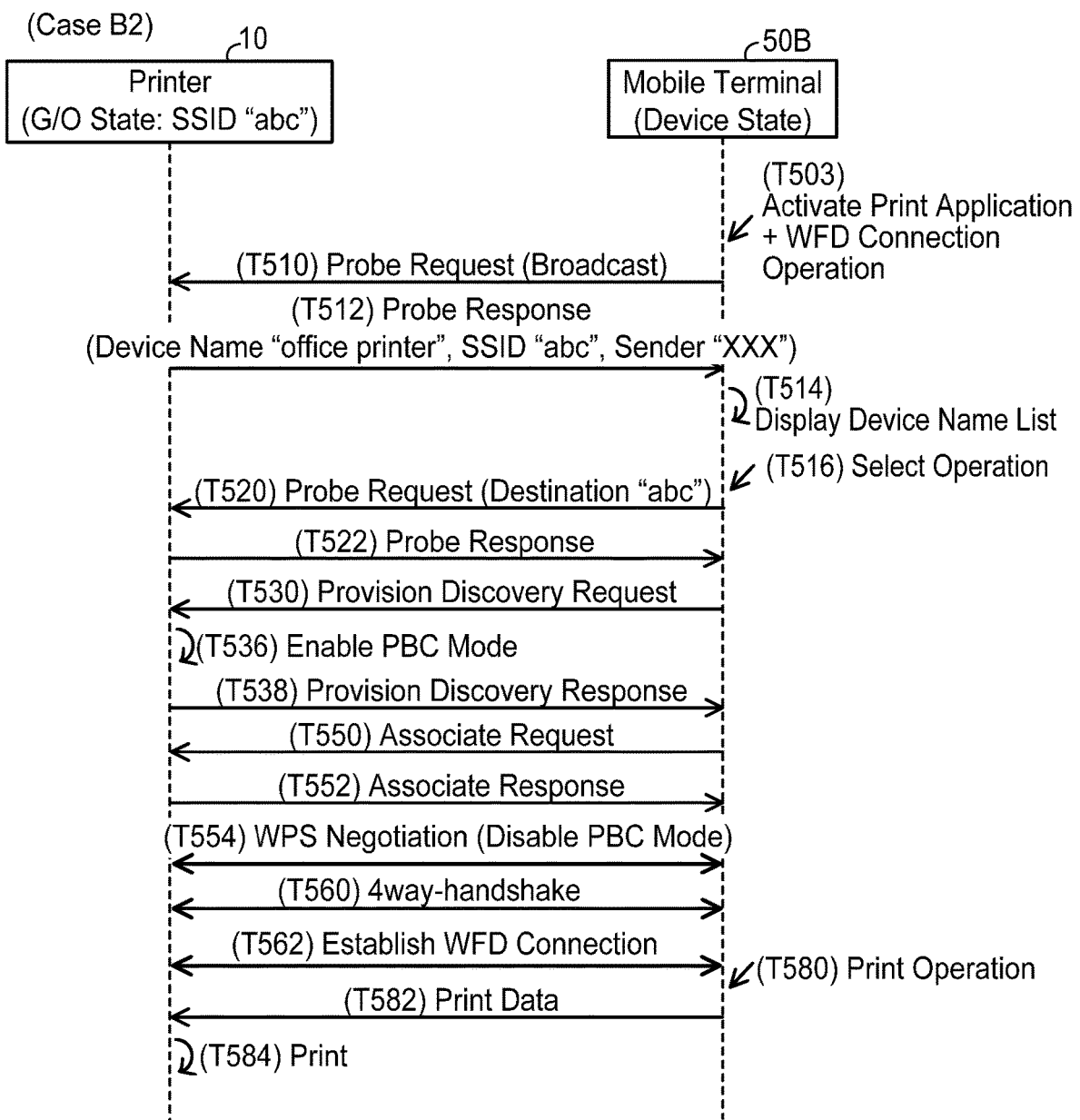
FIG. 7 shows a sequence diagram of Case B2 in which a WFD connection is established without establishing an NFC connection, under the situation where the printer is in the G/O state.

(Case B2; FIG. 7)

Next, Case B2 in which a WFD connection is established without an NFC connection being established between the printer 10 and the mobile terminal 50B under the situation where the printer 10 is in the G/O state will be described with reference to FIG. 7. T503 and T510 are the same as T103 and T110 of FIG. 3. In T512, the CPU 32 of the printer 10 sends a Probe response including the device name "office printer", the SSID "abc", and the MAC address "XXX" of the printer 10 to the mobile terminal 50B.

T514 and T516 are the same as T114 and T116 of FIG. 3. In this case, in T520, the mobile terminal 50B identifies the SSID "abc" included in the Probe response of T512 including the selected device name "office printer" (i.e., the printer 10, which is the connection target, is identified), and sends to the printer 10 a Probe request including the identified SSID "abc" as its destination. T522 and T530 are the same as T122 and T130 of FIG. 3.

In response to receiving the Provision Discovery request from the mobile terminal 50B in T530, The CPU 32 enables the PBC mode in T536, and sends a Provision Discovery response to the mobile terminal 50B in T538. T550 to T584 are the same as T150 to T184 of FIG. 3.

As shown in Cases B1 and B2 of FIGS. 6 and 7, the printer 10 can establish the WFD connections with the respective mobile terminals 50A, 50B. Here, a situation will be assumed in which, after the PBC mode has been enabled in the printer 10 in response to an NFC connection having been established with the mobile terminal 50A (i.e., after T409 of FIG. 6), the WFD connection operation is performed on the mobile terminal 50B which is different from the mobile terminal 50A. In this case, in a conventional printer, there had been a possibility that the WFD connection with the mobile terminal 50A with which the NFC connection has been established could not have suitably been established. A second comparative example indicating an operation of the conventional printer 100 will be described with reference to FIG. 8.

Figure 8:
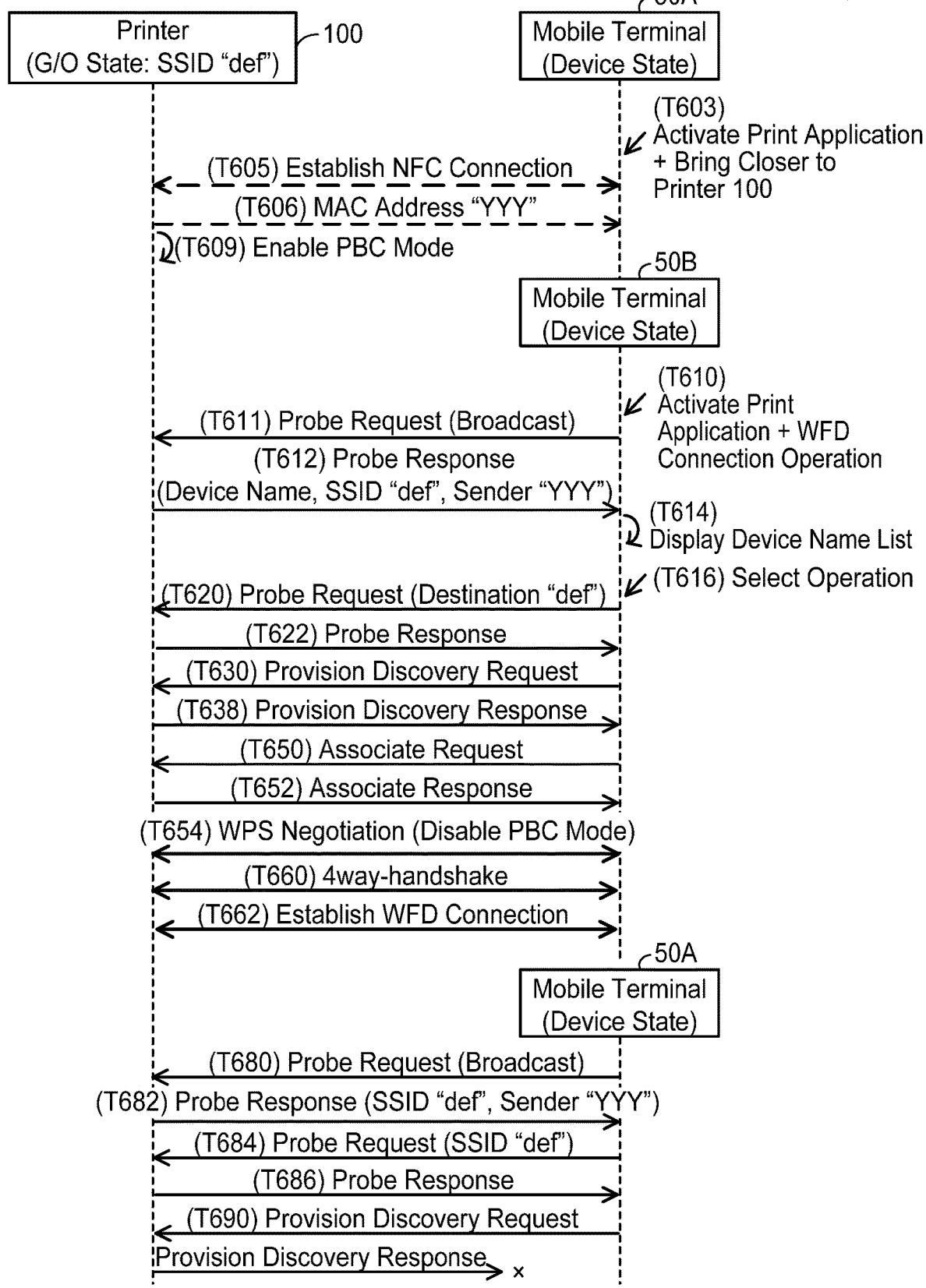
FIG. 8 shows a sequence diagram of a second comparative example.

Second Comparative Example; FIG. 8

T603 to T611 are the same as T203 to T211 of FIG. 4 except that the printer 100 is in the G/O state. In T612, the printer 100 sends to the mobile terminal 50B a Probe response including the device name of the printer 100, an SSID "def" of a wireless network in which the printer 100 operates as the G/O, and the MAC address "YYY" of the sender. Subsequent T614 to T662 are the same as T514 to T562 of FIG. 7 except that the printer 100 is used.

As aforementioned, despite the NFC connection having been established between the printer 100 and the mobile terminal 50A, the WPS Negotiation is executed between the printer 100 and the mobile terminal 50B which is different from the mobile terminal 50A and the PBC mode is disabled in the course of the negotiation (T654). Further, after this, T680 to T690 are executed between the printer 100 and the mobile terminal 50A. T680 to T690 are the same as T410 to T430 of FIG. 6. However, since the printer 100 has disabled the PBC mode (T654), it cannot execute a communication according to the PBC mode with the mobile terminal 50A. Thus, the printer 100 does not send a Provision Discovery response to the mobile terminal 50A, as a result of which a WFD connection with the mobile terminal 50A cannot be established.

As shown in the second comparative example, the conventional printer 100 has the possibility of not being able to establish the WFD connection with the mobile terminal 50A with which the NFC connection had been established. Contrary to this, the printer 10 of the present embodiment can suitably establish the WFD connection with the mobile terminal 50A with which the NFC connection had been established by executing processes of FIG. 9 described below.

Figure 9:
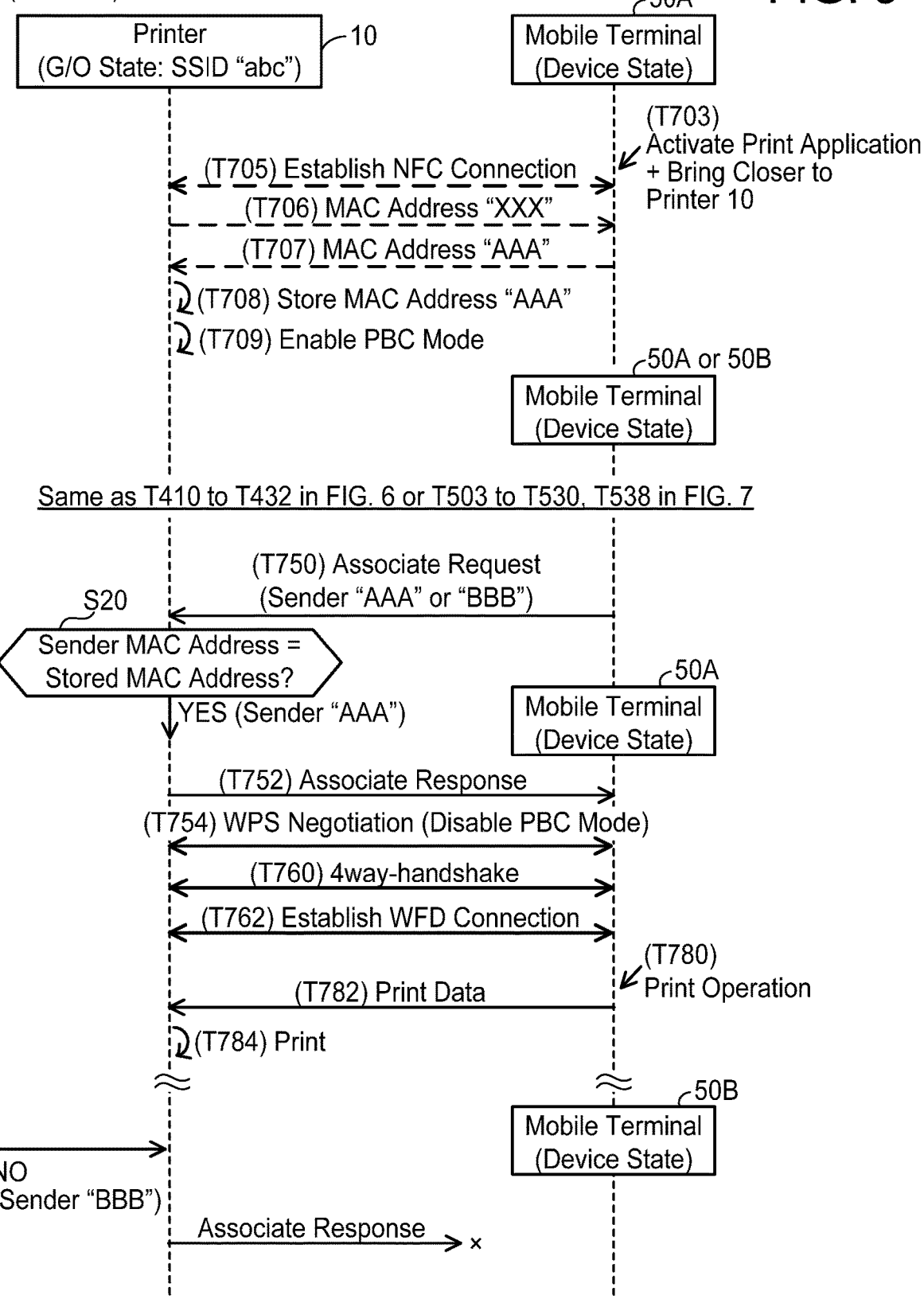
FIG. 9 shows a sequence diagram of Case B3 in which whether MAC addresses are identical to each other is determined under the situation where the printer is in the G/O state.

(Case B3; FIG. 9)

Case B3 in which a WFD connection is suitably established between the printer 10 and the mobile terminal 50A will be described with reference to FIG. 9. T703 to T709 are the same as T303 to T309 of FIG. 5 except that the printer 10 is in the G/O state.

Next, the CPU 32 executes a communication with the target mobile terminal (i.e., the mobile terminal 50A or the mobile terminal 50B). In a case where the target mobile terminal is the mobile terminal 50A, processes same as those of T410 to T432 of FIG. 6 are executed, and in a case where the target mobile terminal is the mobile terminal 50B, processes same as those of T503 to T530 and T538 of FIG. 7 are executed. After this, in T750, the CPU 32 receives an Associate request from the target mobile terminal. This Associate request includes the MAC address of the target mobile terminal (i.e., "AAA" or "BBB").

In S20, the CPU 32 determines whether or not the MAC address of the sender in the Associate request and the MAC address "AAA" stored in the memory 34 in T708 are identical to each other. In a case of determining that the MAC address of the sender and the stored MAC address "AAA" are identical, that is, in the case where the target mobile terminal is the mobile terminal 50A (YES in S20), the CPU 32 sends an Associate response to the mobile terminal 50A in T752. T754 to T784 are the same as T54 to T84 of FIG. 2. That is, the CPU 32 establishes a WFD connection with the mobile terminal 50A (T762), receives print data from the mobile terminal 50A by using the WFD connection (T782), and causes the print executing unit 20 to execute printing according to the print data (T784).

On the other hand, in a case of determining that the MAC address of the sender and the stored MAC address "AAA" are not identical, that is, in the case where the target mobile terminal is the mobile terminal 50B which is different from the mobile terminal 50A (NO in S20), the CPU 32 does not send an Associate response to the mobile terminal 50B. Due to this, the CPU 32 does not execute subsequent communications (i.e., the communications corresponding to T754 to T762) with the mobile terminal 50B, so a WFD connection with the mobile terminal 50B is not established. Thus, after this, the CPU 32 can execute the communications of T410 to T432 of FIG. 6 and T752 to T760 of FIG. 9 with the mobile terminal 50A, as a result of which a WFD connection with the mobile terminal 50A can suitably be established.

As above, in the case of receiving the Associate request including the MAC address of the sender (i.e., "AAA" or "BBB") from the target mobile terminal (i.e., the mobile terminal 50A or the mobile terminal 50B) (T750) after having established the NFC connection with the mobile terminal 50A and having received the MAC address "AAA" from the mobile terminal 50A (T707), the printer 10 determines whether or not the stored MAC address "AAA" and the MAC address of the sender are identical to each other (S20). In the case where the stored MAC address "AAA" and the MAC address of the sender are identical, that is, in the case where the mobile terminal 50A is the target mobile terminal (YES in S20), the printer 10 sends the Associate response to the mobile terminal 50A (T752) and establishes the WFD connection with the mobile terminal 50A (T762). On the other hand, in the case where the stored MAC address "AAA" and the MAC address of the sender are not identical, that is, in the case where the mobile terminal 50A is not the target mobile terminal (NO in S20), the printer 10 does not send the Associate response to the mobile terminal 50B. Thus, the printer 10 can suitably establish the WFD connection with the mobile terminal 50A after the NFC connection has been established with the mobile terminal 50A.

(Corresponding Relationships)

The printer 10, the mobile terminal 50A, and the target mobile terminal are respectively examples of "communication device", "first terminal device", and "second terminal device". The NFC I/F 18 and the Wi-Fi I/F 16 are respectively examples of "first wireless interface" and "second wireless interface". The NFC connection and the WFD connection established between the printer 10 and the mobile terminal 50A are respectively examples of "first wireless connection" and "second wireless connection". The MAC address "AAA" is an example of "first identification information". The MAC address in the G/O Negotiation request of T340 and the MAC address in the Associate request of T750 are examples of "second identification information".

The process of T307 of FIG. 5 (and T707 of FIG. 9) and the process of T340 (and T750) are respectively examples of "receive first identification information in a case where a first wireless connection is established" and "receive a connection request after the first identification information has been received". The processes of S10 of FIG. 5 and S20 of FIG. 9 are examples of "determine whether the first identification information is identical to the second identification information". The processes of T342 to T362 of FIG. 5 and T752 to 762 of FIG. 9 are examples of "establish a second wireless connection".

Figure 10:
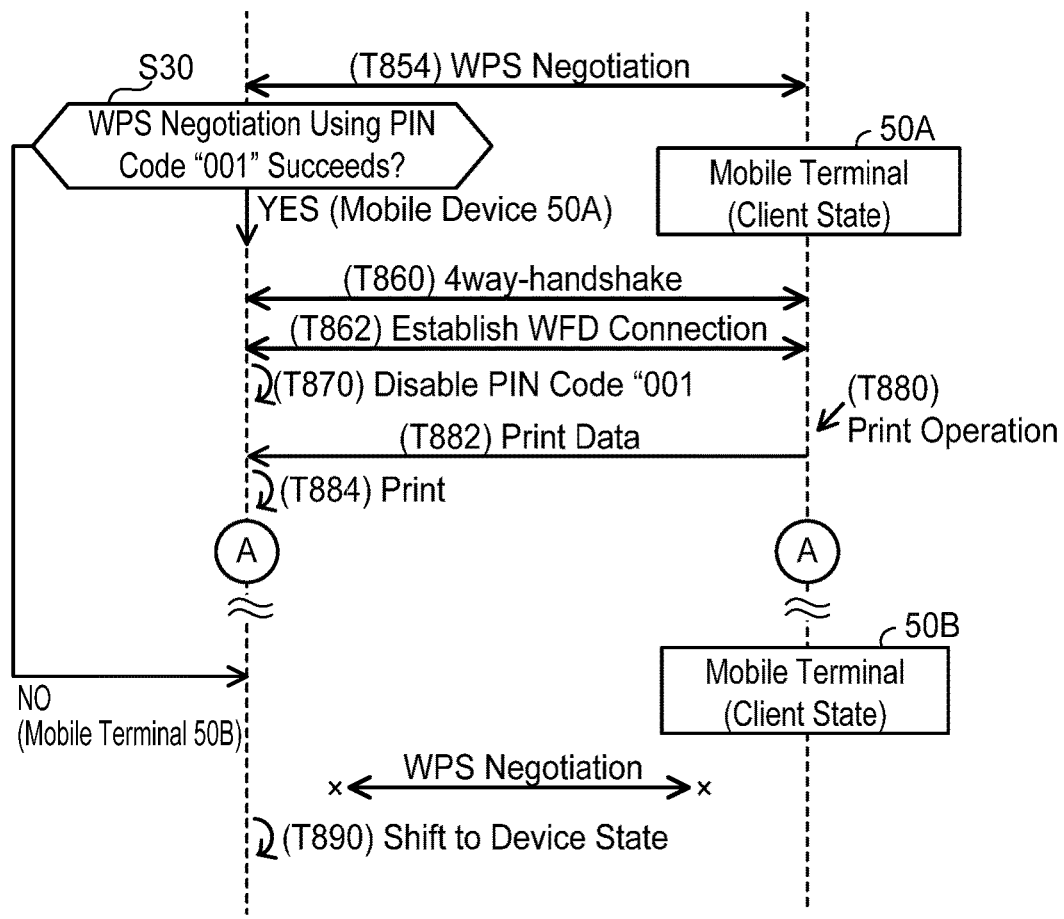
FIG. 10 shows a sequence diagram of a second embodiment.

Second Embodiment; FIGS. 10 and 11

Next, a second embodiment will be described with reference to FIGS. 10 and 11. The second embodiment differs from the first embodiment in that the Wi-Fi I/F 16 supports a PIN (abbreviation of Personal Identification Number) code scheme of the WPS standard. As shown in the first and second comparative examples of FIGS. 4 and 8, in the conventional printer 100, there has been the possibility that the WFD connection may not suitably be established with the mobile terminal 50A with which the NFC connection has been established. In this embodiment, the printer 10 can suitably establish a WFD connection with the mobile terminal 50A with which an NFC connection has been established by executing following processes using the PIN code scheme (i.e., processes of FIGS. 10 and 11).

In T800 of FIG. 10, the power of the printer 10 is turned on by the user. In this case, in T801, the CPU 32 of the printer 10 generates a PIN code "001" according to the PIN code scheme, supplies the MAC address "XXX" of the printer 10 and the generated PIN code "001" to the NFC I/F 18, and causes the MAC address "XXX" and the PIN code "001" to be stored in the memory 19 of the NFC I/F 18.

T803 and T805 are the same as T303 and T305 of FIG. 5. In T806, the NFC I/F 18 of the printer 10 uses the NFC connection to send the MAC address "XXX" and the PIN code "001" in the memory 19 to the mobile terminal 50A. Due to this, in the WPS Negotiation to be described later, the PIN code "001" is used by the mobile terminal 50A. Next, the NFC I/F 18 supplies the CPU 32 with a notification indicating that the NFC connection has been established, that is, a notification indicating that the MAC address "XXX" and the PIN code "001" have been sent. In this case, in T808, the CPU 32 generates a PIN code "002" that is different from the PIN code "001", supplies the generated PIN code "002" to the NFC I/F 18, and causes the PIN code "002" to be stored in the memory 19 as a substitute of the PIN code "001". Due to this, even if the NFC I/F 18 establishes an NFC connection with a mobile terminal that is different from the mobile terminal 50A after this, the PIN code "002" which is different from the PIN code "001" is sent to this mobile terminal, so the same PIN code can be prevented from being used by plural different mobile terminals.

In T809, the CPU 32 enables the PIN code "001". Due to this, the CPU 32 uses the PIN code "001" in accordance with the PIN code scheme and enters a state in which a WFD connection can be established.

Next, the CPU 32 executes communication with the target mobile terminal (i.e., the mobile terminal 50A or the mobile terminal 50B). In the case where target mobile terminal is the mobile terminal 50A, processes same as those of T10 to T52 of FIG. 2 are executed, and in the case where the target mobile terminal is the mobile terminal 50B, processes same as those of T103 to T130 and T132 to T152 of FIG. 3 are executed. After this, in T854, the CPU 32 starts the WPS Negotiation with the target mobile terminal.

In S30, the CPU 32 determines whether or not the WPS Negotiation using the PIN code "001" with the target mobile terminal has succeeded. Specifically, in a case of receiving encrypted information encrypted by a specific algorithm used in the PIN code scheme using the PIN code "001" from the target mobile terminal in at least a part of the process of the WPS Negotiation, the CPU 32 determines that the target mobile terminal is the mobile terminal 50A (YES in S30). In a variant, the CPU 32 may determine that the target mobile terminal is the mobile terminal 50A in a case of sending encrypted information encrypted by a specific algorithm using the PIN code "001" to the target mobile terminal and receiving a response to this encrypted information from the target mobile terminal. The CPU 32 sends target information (e.g., SSID, password) to be communicated in the WPS Negotiation to the mobile terminal 50A, and completes the WPS Negotiation with the mobile terminal 50A. The CPU 32 executes the 4way-handshake communication with the mobile terminal 50A in T860, and establishes a WFD connection with the mobile terminal 50A in T862. Then, in T870, the CPU 32 disables the PIN code "001". T880 to T884 are the same as T80 to T84 of FIG. 2.

On the other hand, in a case of receiving encrypted information encrypted by a specific algorithm using a PIN code different from the PIN code "001" from the target mobile terminal, the CPU 32 determines that the target mobile terminal is the mobile terminal 50B which is different from the mobile terminal 50A (NO in S30). In this case, the CPU 32 cancels the WPS Negotiation with the mobile terminal 50B. Due to this, the CPU 32 does not execute the following processes (i.e., processes corresponding to T860 and T862), so it does not establish a WFD connection with the mobile terminal 50B. The CPU 32 may cancel the WPS Negotiation by not sending a response to the mobile terminal 50B, or may cancel the WPS Negotiation by sending a response indicating that the WPS Negotiation will be canceled to the mobile terminal 50B.

In T890, the CPU 32 shifts to the device state. Due to this, the CPU 32 thereafter can execute the communications of T10 to T52 of FIG. 2, T854 (further YES in S30), T860, and T862 of FIG. 10 with the mobile terminal 50A, as a result of which a WFD connection with the mobile terminal 50A can suitably be established.

As above, after having established the NFC connection with the mobile terminal 50A and having sent the PIN code "001" to the mobile terminal 50A (T806), the printer 10 determines whether or not the encrypted information encrypted by the specific algorithm using the PIN code "001" has been received from the target mobile terminal in the process of executing the WPS Negotiation with the target mobile terminal (i.e., the mobile terminal 50A or the mobile terminal 50B) (S30). In the case of determining that the encrypted information encrypted by the specific algorithm using the PIN code "001" has been received from the target mobile terminal, that is, in the case where the mobile terminal 50A is the target mobile terminal (YES in S30), the printer 10 completes the WPS Negotiation with the mobile terminal 50A and establishes the WFD connection with the mobile terminal 50A. On the other hand, in the case of determining that the encrypted information encrypted by the specific algorithm using the PIN code "001" has not been received from the target mobile terminal, that is, in the case where the mobile terminal 50A is not the target mobile terminal (NO in S30), the printer 10 cancels the WPS Negotiation with the mobile terminal 50B. Thus, the printer 10 can suitably establish the WFD connection with the mobile terminal 50A after the NFC connection has been established with the mobile terminal 50A.

FIG. 11 shows the case continuing from T884 of FIG. 10. T903 and T905 are the same as T3 and T5 of FIG. 2 except that the communication target is the mobile terminal 50C. In T906, the NFC I/F 18 of the printer 10 uses the NFC connection to send the MAC address "XXX" and the PIN code "002" in the memory 19 to the mobile terminal 50C. As a result, the CPU 32 generates a PIN code "003" that is different from the PIN code "002" and causes the PIN code "003" to be stored in the memory 19 as a substitute of the PIN code "002" in T908, and enables the PIN code "002" in T909.

Next, the CPU 32 executes communication with the target mobile terminal. Since the WFD connection with the mobile terminal 50A is already established (T862 of FIG. 10), the target mobile terminal here is the mobile terminal 50C or the mobile terminal 50B. In a case where the target mobile terminal is the mobile terminal 50C, processes same as those of T410 to T452 of FIG. 6 are executed except that the communication target is the mobile terminal 50C, and in the case where the mobile terminal 50B is the target mobile terminal, processes same as those of T503 to T530 and T538 to T552 of FIG. 7 are executed. After this, in T954, the CPU 32 starts the WPS Negotiation with the target mobile terminal.

S35 is the same as S30 of FIG. 10 except that the PIN code "002" is used. In a case of receiving encrypted information encrypted by a specific algorithm using the PIN code "002" from the target mobile terminal, that is, in the case where the target mobile terminal is the mobile terminal 50C (YES in S35), the CPU 32 executes processes of T960 to T984 with the mobile terminal 50C. T960 to T984 are the same as T860 to T884 of FIG. 10 except that the communication target is the mobile terminal 50C.

On the other hand, in a case of not receiving the encrypted information encrypted by the specific algorithm using the PIN code "002" from the target mobile terminal, that is, in the case where the target mobile terminal is the mobile terminal 50B which is different from the mobile terminal 50C (NO in S35), the CPU 32 cancels the WPS Negotiation with the mobile terminal 50B. Thus, after this, the CPU 32 can suitably establish a WFD connection with the mobile terminal 50C.

(Corresponding Relationships)

The PIN code "001" and the PIN code "002" are respectively examples of "first authentication information" and "second authentication information". The WPS Negotiation is an example of "predetermined communication". The encrypted information encrypted by the specific algorithm using the PIN code "001" received from the target mobile terminal is an example of "specific information". The NFC connection established between the printer 10 and the mobile terminal 50C is an example of "third wireless connection". In the configuration of the aforementioned variant, that is, in the case where the printer 10 sends the encrypted information encrypted by the specific algorithm using the PIN code "001" to the target terminal device, the response to this encrypted information received from the target mobile terminal is an example of "specific information".

The process of T806 of FIG. 10 (and T906 of FIG. 11) and the process of S30 (and S35) are respectively examples of "send first authentication information" and "determine whether specific information is received from a second terminal device". The processes of T860, T862, T960, and T962 are examples of "establish the second wireless connection via the second wireless interface".

Third Embodiment; FIG. 12

Next, a third embodiment will be described with reference to FIG. 12. Similar to the second embodiment, in the third embodiment, the Wi-Fi I/F 16 supports the PIN code scheme in the WPS standard. Further, in this embodiment, the printer 10 executes both the determination whether the MAC addresses are identical (e.g., S10 of FIG. 5) of the first embodiment and the determination whether the PIN codes are identical (e.g., S30 of FIG. 10) of the second embodiment.

T1000 to T1006 are the same as T800 to 806 of FIG. 10. The CPU 32 uses the NFC connection to receive the MAC address "AAA" of the mobile terminal 50A from the mobile terminal 50A in T1007, stores the MAC address "AAA" in the memory 34 in T1008, and enables the PIN code "001" in T1009.

Next, the CPU 32 executes communication with the target mobile terminal (i.e., the mobile terminal 50A or the mobile terminal 50B). In the case where the target mobile terminal is the mobile terminal 50A, processes same as those of T10 to T32 of FIG. 2 are executed, and in the case where the target mobile terminal is the mobile terminal 50B, processes same as those of T103 to T130 and T132 of FIG. 3 are executed. After this, in T1040, the CPU 32 receives a G/O Negotiation request from the target mobile terminal. This G/O Negotiation request includes the MAC address of the target mobile terminal (i.e., "AAA" or "BBB").

S40 is the same as S10 of FIG. 5. In the case of determining that the MAC address of the sender and the stored MAC address "AAA" are identical to each other, that is, in the case where the target mobile terminal is the mobile terminal 50A (YES in S40), the CPU 32 sends a G/O Negotiation response to the mobile terminal 50A in T1042 and executes the G/O Negotiation with the mobile terminal 50A. On the other hand, in the case of determining that the MAC address of the sender and the stored MAC address "AAA" are not identical, that is, in the case where the target mobile terminal is the mobile terminal 50B which is different from the mobile terminal 50A (NO in S40), the CPU 32 does not send the G/O Negotiation response to the mobile terminal 50B.

T1044 to T1054 are the same as T44 to T54 of FIG. 2. That is, as the result of the G/O Negotiation with the mobile terminal 50A, the CPU 32 shifts to the G/O state (T1044) and starts the WPS Negotiation with the mobile terminal 50A (T1054).

S50 is the same as S30 of FIG. 10. In the case of receiving the encrypted information encrypted by the specific algorithm using the PIN code "001" from the target mobile terminal, that is, in the case where the target mobile terminal is the mobile terminal 50A (YES in S50), the CPU 32 completes the WPS Negotiation with the mobile terminal 50A, executes the 4way-handshake communication with the mobile terminal 50A in T1060, and establishes a WFD connection with the mobile terminal 50A in T1062. T1070 is the same as T870 of FIG. 10, and T80 to T84 are the same as T80 to T84 of FIG. 2.

On the other hand, in the case of not receiving the encrypted information encrypted by the specific algorithm using the PIN code "001" from the target mobile terminal, that is, in the case where the target mobile terminal is the mobile terminal 50B which is different from the mobile terminal 50A (NO in S50), the CPU 32 cancels the WPS Negotiation with the mobile terminal 50B.

In this embodiment, the printer 10 establishes the WFD connection with the mobile terminal 50A (T1062) in the case where the stored MAC address "AAA" and the MAC address of the sender in the G/O Negotiation request are determined to be identical (YES in S40) and the encrypted information encrypted by the specific algorithm using the PIN code "001" has been received from the target mobile terminal in the process of executing the WPS Negotiation with the target mobile terminal (YES in S50). For example, a situation will be assumed in which a G/O Negotiation request including the MAC address "AAA" from the mobile terminal 50B, of which MAC address is falsified as "AAA" by a malicious third party, is received. In this case, the printer 10 determines that the MAC address of the sender and the stored MAC address "AAA" are identical (YES in S40), and executes the processes corresponding to T1042 to T1054 with the mobile terminal 50B. However, since the printer 10 further executes the process of S50, in which the determination will be made that the encrypted information encrypted by the specific algorithm using the PIN code "001" has not been received (NO in S50), it cancels the WPS Negotiation with the mobile terminal 50B and does not establish the WFD connection with the mobile terminal 50B.

Thus, the printer 10 can suitably establish the WFD connection with the mobile terminal 50A after the NFC connection has been established with the mobile terminal 50A.

(Variant 1) In S10 of FIG. 5, in the case of determining that the MAC address of the sender and the stored MAC address "AAA" are identical (YES in S10), the CPU 32 may send a G/O Negotiation response indicating that the G/O Negotiation is to be executed to the mobile terminal 50A, and in the case of determining that the MAC address of the sender and the stored MAC address "AAA" are not identical (NO in S10), the CPU 32 may send a G/O Negotiation response indicating that the G/O Negotiation will not be executed to the mobile terminal 50B. Further, in S20 of FIG. 9, in the case of determining that the MAC address of the sender and the stored MAC address "AAA" are identical (YES in S20), the CPU 32 may send an Associate response indicating that the WPS Negotiation is to be executed to the mobile terminal 50A, and in the case of determining that the MAC address of the sender and the stored MAC address "AAA" are not identical (NO in S20), the CPU 32 may send an Associate response indicating that the WPS Negotiation will not be executed to the mobile terminal 50B. In this variant, the G/O Negotiation response indicating that the G/O Negotiation is to be executed and the Associate response indicating that the WPS Negotiation is to be executed are examples of "predetermined response".

(Variant 2) In the case of receiving the Provision Discovery request including the MAC address of the sender (i.e., "AAA" or "BBB") from the target mobile terminal (i.e., mobile terminal 50A or mobile terminal 50B), the CPU 32 may execute the processes of S10 of FIG. 5 and S20 of FIG. 9. In this case, the CPU 32 sends the Provision Discovery response to the mobile terminal 50A in the case of determining that the stored MAC address "AAA" and the MAC address of the sender are identical, and does not send the Provision Discovery response to the mobile terminal 50B in the case of determining that the stored MAC address "AAA" and the MAC address of the sender are not identical. In this variant, the Provision Discovery request and the Provision Discovery response are respectively examples of "connection request" and "predetermined response".

(Variant 3) In T307 of FIG. 5, the CPU 32 may receive from the mobile terminal 50A a device name of the mobile terminal 50A, instead of the MAC address "AAA" of the mobile terminal 50A or together with the MAC address "AAA" of the mobile terminal 50A. In this case, the CPU 32 stores the received MAC address and/or the device name in the memory 34 in T308, and in a case of receiving a G/O Negotiation request including the MAC address and/or the device name of the target mobile terminal from the target mobile terminal in T340, the CPU 32 determines whether or not the stored MAC address and/or device name of the mobile terminal 50A are identical to the MAC address and/or the device name in the G/O Negotiation request. Generally, "first (or second) identification information" may be at least one of a MAC address of first (or second) terminal device and a device name of the first (or second) terminal device. Further, in another variant, the CPU 32 may determine whether or not the mobile terminal 50A is the target mobile terminal by using other identification information that identifies the mobile terminal 50A (e.g., UUID (abbreviation of Universally Unique Identifier)). Generally, the "first (or second) identification information" may be information that identifies the first (or second) terminal device.

(Variant 4) The processes of T808 of FIG. 10 and T908 of FIG. 11 may be omitted. That is, "generate second authentication information" may be omitted.

(Variant 5) For example, in FIG. 5, the CPU32 executes the G/O Negotiation with the mobile terminal 50A (see T340, T342), however, as a substitute thereof, the CPU 32 may shift to the G/O state in response to the NFC connection with the mobile terminal 50A being established (T305). In this case, the CPU 32 does not execute T340, S10, T342, and T344, and in the case of receiving the Associate request from the target mobile terminal (T350), it may execute the determination whether the MAC addresses are identical. Then, in the case of determining that the MAC addresses are identical, the CPU 32 sends the Associate response to the mobile terminal 50A, and in the case of determining that the MAC addresses are not identical, the CPU 32 does not send the Associate response to the mobile terminal 50B. In this variant, the Associate request and the Associate response are respectively examples of "connection request" and "predetermined response".

(Variant 6) In S30 of FIG. 10, the CPU 32 may determine YES in S30 in the case of receiving the PIN code "001" from the target mobile terminal in the process of the WPS Negotiation. In the present variant, the PIN code "001" is an example of "specific information", and "first authentication information" and "specific information" may be same information.

(Variant 7) The printer 10 may not support the WFD scheme, and as a substitute thereof, it may support a SoftAP scheme, for example. In this case, for example, in FIG. 5, the CPU 32 may shift from a state where SoftAP is not activated to a state where the SoftAP is activated in response to the NFC connection with the mobile terminal 50A being established (T305). In this case, similar to the above variant 5, the CPU 32 does not execute T340, S10, and T342, and in the case of receiving the Associate request from the target mobile terminal, it may execute the determination whether the MAC addresses are identical. The G/O state in the WFD scheme and the state where the SoftAP is activated may collectively be called "parent station state".

(Variant 8) In this variant, the printer 10 may be provided with a BT (abbreviation of Bluetooth (registered trademark)) I/F as a substitute of the NFC I/F 18. In this case, T305 to T307 of FIG. 5 are executed according to BT, for example. In the present variant, the BT I/F is an example of "first wireless interface". Further, in another variant, the printer 10 may not be provided with either the NFC I/F 18 or the BT I/F. In this case, the Wi-Fi I/F 16 of the printer 10 may support a Wi-Fi HaLow scheme based on IEEE 802.11ah or a Wi-Fi Aware scheme based on IEEE802.11s. In this case, T305 to T307 of FIG. 5 are executed according to the Wi-Fi HaLow scheme or the Wi-Fi Aware scheme, for example. In the present variant, the Wi-Fi I/F 16 is an example of "first wireless interface" and "second wireless interface".

(Variant 9) "Communication device" may not be a printer, and may be another device such as a scanner, a multi-function device, a mobile terminal, a PC, or a server.

(Variant 10) In the respective embodiments as above, the processes of FIGS. 2, 3, 5 to 7, and 9 to 12 are implemented by software (i.e., program 36), however, at least one of these processes may be implemented by hardware such as a logic circuit.

What is claimed is:

1. A communication device comprising:
    a first wireless interface;
    a second wireless interface;
    a processor; and
    a memory storing computer-readable instructions therein, the computer-readable instructions, when executed by the processor, causing the communication device to:

in a case where a first wireless connection via the first wireless interface is established with a first terminal device, receive first identification information for identifying the first terminal device from the first terminal device via the first wireless interface by using the first wireless connection;

after the first identification information has been received from the first terminal device, receive a connection request for requesting establishment of a wireless connection from a second terminal device via the second wireless interface, the connection request including second identification information for identifying the second terminal device;

in a case where the connection request is received from the second terminal device, determine whether the first identification information is identical to the second identification information; and in a case where it is determined that the first identification information is identical to the second identification information, establish a second wireless connection via the second wireless interface with the second terminal device by sending a predetermined response to the second terminal device via the second wireless interface, wherein in a case where it is determined that the first identification information is not identical to the second identification information, the predetermined response is not sent to the second terminal device that is different from the first terminal device.

2. The communication device as in claim 1, wherein in a case where a state of the communication device is a device state of a WFD (abbreviation of Wi-Fi Direct) scheme:
the connection request is a Group Owner Negotiation request; and
the predetermined response is a Group Owner Negotiation response indicating execution of a Group Owner Negotiation.

3. The communication device as in claim 1, wherein in a case where a state of the communication device is a Group Owner state of a WFD (abbreviation of Wi-Fi Direct) scheme:
the connection request is an Associate request; and
the predetermined response is an Associate response indicating establishment of a wireless connection.

4. The communication device as in claim 1, wherein the first identification information is at least one of a MAC address of the first terminal device and a device name of the first terminal device, and the second identification information is at least one of a MAC address of the second terminal device and a device name of the second terminal device.

5. The communication device as in claim 1, wherein the computer-readable instructions, when executed by the processor, further cause the communication device to:

in the case where the first wireless connection is established with the first terminal device, enable an operation of a PBC (abbreviation of Push Button Configuration) mode according to a PBC scheme of a WPS (abbreviation of Wi-Fi Protected Setup) standard.

6. The communication device as in claim 1, wherein the computer-readable instructions, when executed by the processor, further cause the communication device to:

in the case where the first wireless connection is established with the first terminal device, send first authentication information prepared by the communication device to the first terminal device via the first wireless interface by using the first wireless connection; and after the predetermined response has been sent to the second terminal device, determine whether specific information is received from the second terminal device via the second wireless interface during a predetermined communication being executed with the second terminal device, the specific information being obtained by using the first authentication information, the predetermined communication being for establishing the second wireless connection, wherein in a case where it is determined that the specific information is received from the second terminal device, the second wireless connection is established with the second terminal device by completing the predetermined communication with the second terminal device, and in a case where it is determined that the specific information is not received from the second terminal device, the predetermined communication with the second terminal device is canceled.

7. A communication device comprising:

a first wireless interface;
a second wireless interface;
a processor; and
a memory storing computer-readable instructions therein, the computer-readable instructions, when executed by the processor, causing the communication device to:

in a case where a first wireless connection via the first wireless interface is established with a first terminal device, send first authentication information prepared by the communication device to the first terminal device via the first wireless interface by using the first wireless connection;

after the first authentication information has been sent to the first terminal device, determine whether specific information is received from a second terminal device via the second wireless interface during a predetermined communication being executed with the second terminal device, the specific information being obtained by using the first authentication information, the predetermined communication being for establishing a second wireless connection; and in a case where it is determined that the specific information is received from the second terminal device, establish the second wireless connection via the second wireless interface with the second terminal device by completing the predetermined communication with the second terminal device, wherein in a case where it is determined that the specific information is not received from the second terminal device, the predetermined communication with the second terminal device is canceled.

8. The communication device as in claim 7, wherein the computer-readable instructions, when executed by the processor, further cause the communication device to:

in a case where the first authentication information is sent to the first terminal device, generate second authentication information different from the first authentication information; and in a case where a third wireless connection via the first wireless interface is established with a third terminal device after the first authentication information has been sent to the first terminal device, send the second authentication information to the third terminal device via the first wireless interface by using the third wireless connection.

9. The communication device as in claim 8, wherein
in a case where the predetermined communication with the second terminal device is executed after the second authentication information has been sent to the third terminal device, despite the second authentication information having been already sent, it is determined whether the specific information is received from the second terminal device, the specific information being obtained by using the first authentication information which had been sent before the second authentication information.

10. The communication device as in claim 7, wherein
the first wireless interface is a tag interface according to an NFC (abbreviation of Near Field Communication) scheme.

11. The communication device as in claim 7, wherein
the computer-readable instructions, when executed by the processor, further cause the communication device to:
while a state of the communication device is a device state of a WFD (abbreviation of Wi-Fi Direct) scheme, and after the first wireless connection has been established with the first terminal device and before the predetermined communication with the second terminal device is executed, shift the state of the communication device from the device state to a Group Owner state or a Client state of the WFD scheme; and
in a case where it is determined that the specific information is not received from the second terminal device after the state of the communication device has been shifted from the device state to the Group Owner state or the Client state, shift the state of the communication device from the Group Owner state or the Client state to the device state,
wherein in a case where it is determined that the specific information is received from the second terminal device, the state of the communication device is not shifted from the Group Owner state or the Client state to the device state.

12. The communication device as in claim 7, wherein
the first authentication information is a PIN (abbreviation of Personal Identification Number) code according to a PIN code scheme of a WPS (abbreviation of Wi-Fi Protected Setup) standard.

13. The communication device as in claim 7, wherein
the predetermined communication is a Negotiation according to a WPS (abbreviation of Wi-Fi Protected Setup).

14. A non-transitory computer-readable recording medium storing computer-readable instructions for a communication device,
wherein the computer-readable instructions, when executed by a processor of the communication device, cause the communication device to:
in a case where a first wireless connection via a first wireless interface of the communication device is established with a first terminal device, receive first identification information for identifying the first terminal device from the first terminal device via the first wireless interface by using the first wireless connection;
after the first identification information has been received from the first terminal device, receive a connection request for requesting establishment of a wireless connection from a second terminal device via a second wireless interface of the communication device, the connection request including second identification information for identifying the second terminal device;
in a case where the connection request is received from the second terminal device, determine whether the first identification information is identical to the second identification information; and
in a case where it is determined that the first identification information is identical to the second identification information, establish a second wireless connection via the second wireless interface with the second terminal device by sending a predetermined response to the second terminal device via the second wireless interface,
wherein in a case where it is determined that the first identification information is not identical to the second identification information, the predetermined response is not sent to the second terminal device that is different from the first terminal device.

15. A non-transitory computer-readable recording medium storing computer-readable instructions for a communication device,
wherein the computer-readable instructions, when executed by a processor of the communication device, cause the communication device to:
in a case where a first wireless connection via a first wireless interface of the communication device is established with a first terminal device, send first authentication information prepared by the communication device to the first terminal device via the first wireless interface by using the first wireless connection;
after the first authentication information has been sent to the first terminal device, determine whether specific information is received from a second terminal device via a second wireless interface of the communication device during a predetermined communication being executed with the second terminal device, the specific information being obtained by using the first authentication information, the predetermined communication being for establishing a second wireless connection; and
in a case where it is determined that the specific information is received from the second terminal device, establish the second wireless connection via the second wireless interface with the second terminal device by completing the predetermined communication with the second terminal device,
wherein in a case where it is determined that the specific information is not received from the second terminal device, the predetermined communication with the second terminal device is canceled.

* * * * *